United States Patent
Chao

(10) Patent No.: US 9,915,476 B2
(45) Date of Patent: Mar. 13, 2018

(54) METALLURGICAL FURNACE

(71) Applicant: 9282-3087 Quebec Inc., Brossard (CA)

(72) Inventor: John Chao, Quebec (CA)

(73) Assignee: 9282-3087 QUEBEC INC., Brossard, Quebec (CA)

( * ) Notice: Subject to any disclaimer, the term of this patent is extended or adjusted under 35 U.S.C. 154(b) by 0 days.

(21) Appl. No.: 15/248,368

(22) Filed: Aug. 26, 2016

(65) Prior Publication Data

US 2017/0030646 A1    Feb. 2, 2017

Related U.S. Application Data

(63) Continuation of application No. 14/575,928, filed on Dec. 18, 2014, which is a continuation-in-part of (Continued)

(51) Int. Cl.
    *F27D 1/00*    (2006.01)
    *F23M 5/00*    (2006.01)
    (Continued)

(52) U.S. Cl.
    CPC ............ *F27D 1/0026* (2013.01); *F27B 3/085* (2013.01); *F27B 3/14* (2013.01); *F27B 3/20* (2013.01); *F27D 1/0006* (2013.01); *F27D 1/0023* (2013.01); *F27D 1/0043* (2013.01); *F27D 1/08* (2013.01); *F27D 1/14* (2013.01);
    (Continued)

(58) Field of Classification Search
    CPC .... F27B 3/085; F27B 3/12; F27B 3/14; F27B 3/16; F27B 3/20; F27B 3/24; F27D 1/0006; F27D 1/0023; F27D 1/0026; F27D 1/0043; F27D 1/004; F27D 1/027; F27D 1/08;
    (Continued)

(56) References Cited

U.S. PATENT DOCUMENTS

| 2,551,420 A | 5/1951 | Conti |
| 2,948,765 A | 8/1960 | Haavik |

(Continued)

FOREIGN PATENT DOCUMENTS

| CA | 1265927 A1 | 2/1990 |
| CA | 1316201 C  | 4/1993 |

(Continued)

OTHER PUBLICATIONS

Francki et al. Design of refractories and bindings for modern high-productivity pyrometallurgical furnaces. CIM Bulletin 86(971):112-118 (Jun. 1993).

(Continued)

*Primary Examiner* — Hung D Nguyen
(74) *Attorney, Agent, or Firm* — Wilson Sonsini Goodrich & Rosati

(57) ABSTRACT

An electrode seal for use in a metallurgical furnace, the furnace comprising a furnace space heated by electrodes extending through an aperture into the furnace space. The electrode seal comprises at least three sets of shoes in consecutive lateral contact, each shoe having a biasing member for biasing a surface of the shoe toward one of the electrodes thereby allowing the one electrode to longitudinally move within the electrode seal while providing electrical insulation between the electrode and the aperture.

32 Claims, 15 Drawing Sheets

ELECTRIC FURNACE SECTION

Related U.S. Application Data application No. PCT/CA2013/001086, filed on Dec. 20, 2013.

(51) Int. Cl.

| | |
|---|---|
| *F23M 5/02* | (2006.01) |
| *C21C 5/44* | (2006.01) |
| *F27B 3/08* | (2006.01) |
| *F27B 3/14* | (2006.01) |
| *F27D 1/08* | (2006.01) |
| *F27D 1/14* | (2006.01) |
| *F27B 3/20* | (2006.01) |
| *F27D 11/10* | (2006.01) |
| *F27D 99/00* | (2010.01) |

(52) U.S. Cl.
CPC .......... *F27D 11/10* (2013.01); *F27D 99/0073* (2013.01); *F27D 2099/0021* (2013.01)

(58) Field of Classification Search
CPC ... F27D 1/12; F27D 1/14; F27D 1/142; F27D 1/145; F27D 1/147; F27D 99/0073
USPC ...... 373/71, 72, 75, 86, 44, 45, 60; 266/214, 266/280, 285, 286; 110/336, 338, 340
See application file for complete search history.

(56) References Cited

U.S. PATENT DOCUMENTS

| | | | |
|---|---|---|---|
| 2,994,288 A | | 8/1961 | Keller |
| 3,197,385 A | | 7/1965 | Wethly |
| 3,379,177 A | | 4/1968 | Stalph |
| 3,396,962 A | * | 8/1968 | Smith ................ C21C 5/44 264/30 |
| 3,568,611 A | | 3/1971 | Konrad et al. |
| 3,683,095 A | | 8/1972 | Valery et al. |
| 3,715,200 A | | 2/1973 | Archibald et al. |
| 3,835,233 A | | 9/1974 | Prenn |
| 3,869,996 A | * | 3/1975 | Panferov ............ F23M 5/06 110/335 |
| 3,967,047 A | | 6/1976 | Long et al. |
| 3,973,076 A | * | 8/1976 | Scott, Jr. ............ C22B 9/18 373/75 |
| 4,071,311 A | | 1/1978 | Errington |
| 4,306,726 A | | 12/1981 | Lefebvre |
| 4,715,042 A | | 12/1987 | Heggart et al. |
| 4,732,652 A | | 3/1988 | Duerselen et al. |
| 4,759,032 A | | 7/1988 | Willis |
| 4,813,055 A | | 3/1989 | Heggart et al. |
| 4,886,247 A | | 12/1989 | Hoffman et al. |
| 4,969,940 A | | 11/1990 | Schwarb et al. |
| 5,056,104 A | | 10/1991 | Ambrosi |
| 5,129,631 A | * | 7/1992 | Van Laar ............ C21B 7/14 266/196 |
| 5,406,580 A | | 4/1995 | McCaffrey |
| 6,075,806 A | | 6/2000 | Wittle et al. |
| 6,249,538 B1 | | 6/2001 | Pavlicevic et al. |
| 6,814,012 B2 | | 11/2004 | McCaffrey et al. |
| 7,134,397 B2 | | 11/2006 | Hutchinson et al. |
| 2005/0263048 A1 | | 12/2005 | Hutchinson et al. |
| 2006/0196399 A1 | * | 9/2006 | McCaffrey ............ F27B 3/12 110/336 |
| 2011/0090934 A1 | | 4/2011 | Xia et al. |
| 2012/0126493 A1 | | 5/2012 | Ollila et al. |
| 2015/0173131 A1 | * | 6/2015 | Venter ................ F27B 3/085 373/101 |
| 2015/0176907 A1 | | 6/2015 | Chao |

FOREIGN PATENT DOCUMENTS

| | | |
|---|---|---|
| CA | 2209682 A1 | 1/1998 |
| CN | 2161886 | 4/1994 |
| CN | 103233090 A | 8/2013 |
| DE | 4031378 A1 | 4/1991 |
| GB | 323561 A | 1/1930 |
| GB | 505824 A | 5/1939 |
| JP | H08303962 A | 11/1996 |
| JP | 2010249477 A | 11/2010 |
| KR | 20110029780 A | 3/2011 |
| KR | 20120021384 A | 3/2012 |
| RU | 2164838 C1 | 4/2001 |
| SU | 513630 A3 | 5/1976 |
| SU | 960510 A1 | 9/1982 |
| WO | WO-9517801 A1 | 6/1995 |
| WO | WO-2007016709 A2 | 2/2007 |
| WO | WO-2013044372 A1 | 4/2013 |
| WO | WO-2015089622 | 6/2015 |

OTHER PUBLICATIONS

PCT/CA2013/001086 International Search Report and Written Opinion dated Jul. 16, 2014.
U.S. Appl. No. 14/575,928 Office Action dated Jun. 29, 2016.
U.S. Appl. No. 14/575,928 Office Action dated Dec. 30, 2016.
Co-pending U.S. Appl. No. 15/669,002, filed Aug. 4, 2017.
PCT/CA2013/001086 International Preliminary Report on Patentability dated May 15, 2015.

\* cited by examiner

ELECTRIC FURNACE MIDDLE PLAN

ELECTRIC FURNACE BOTTOM PLAN

ELECTRIC FURNACE SECTION

ELECTRIC FURNACE SECTION

FRONT VIEW OF REFRATORY

DETAIL OF TOP

ELECTRICAL FURNACE ELEVATION

ELECTRICAL FURNACE DETAIL

ELECTRIC FURNACE TOP PLAN

WATER COOLED BLOCK SECTION

WATER COOLED BLOCK BOTTOM PLAN

ELECTRODE SECTION

ELECTRODE MIDDLE PLAN

ELECTRODE WATER CHANNEL PLAN

SIDE VIEW OF SPRING ARRANGMENT

SCHEMATIC TOP VIEW OF THE SPRING LOCATIONS

SCHEMATIC LONGITUDINAL SIDE VIEW

SCHEMATIC END SIDE VIEW

TOP VIEW OF ARRANGEMENT FOR RECTANGULAR FURNACE

METALLURGICAL FURNACE

CROSS-REFERENCE

This application is a continuation of U.S. patent application Ser. No. 14/575,928 filed Dec. 18, 2014, which is a continuation in part of PCT application serial no. PCT/CA2013/001086, filed Dec. 20, 2013, both of which are incorporated herein by reference in their entirety.

TECHNICAL FIELD

This invention generally relates to metallurgical furnaces, and, more particularly, to electrical metallurgical furnaces.

BACKGROUND

Several forms of metallurgical furnace having a refractory, an outer steel shell surrounding the refractory, a roof, and a hearth are known in the art. Furnaces known in the art may be rectangular or square in horizontal section (when viewed from above or below), or may be round in horizontal section. Furnaces known in the art generally have a metal structure supported by the hearth and protected by the refractory, in which metal, slag, and other materials are to be heated. Above the heated metal and slag is an area of space referred to as "freeboard", which is surrounded horizontally by the refractory. An electrical metallurgical furnace uses electricity for heating and melting. More particularly, in the typical round electrical metallurgical furnace, three electrodes are used to produce electric arcs for heating the contents of the hearth. In the typical electrical furnace, the refractory is typically made of stacked bricks.

The brick refractory typically serves to provide thermal insulation between different elements inside the furnace, including molten metal and slag as well as heated gas in the inner furnace space, from the surrounding environment. In furnaces known in the art, the temperature of the molten material may range from 1400 to 2200 degrees Celsius. In use, the inner surface of the brick refractory may be coated with a solid layer of "frozen" slag or deposited fumes and dusts, also referred to as a "skull", which layer may be heated to a temperature in excess of 1000 degrees Celsius. The thickness of this "skull" will vary depending on the furnace power level and arc length, which is a function of voltage.

In some furnaces known in the art, gaps between the bricks of the brick refractory and cracks within the bricks tend to form over time and use, especially over the course of repeated heating and cooling cycles due to thermal stresses. Further, the brick refractory may be corroded or degraded due to chemical, thermal, and mechanical stresses caused by the properties of the molten metal and slag contained therein, resulting in eventual breakdown of the refractory from within. Gaps and cracks in the refractory may result in escape of molten metal from the furnace, into the brickwork of the refractory. Wearing down and breaking of the bricks may ultimately result in failure of the refractory. The risk of leak through the skull and then through spaces in the refractory, and eventually out of the furnace, is increased by the gaps between the bricks of the refractory.

In some furnaces known in the art, the roof fails to provide adequate thermal insulation for the surrounding environment. The roof may further fail to provide a barrier to prevent the escape of toxic gases, including carbon monoxide, into the surrounding environment, creating a potentially hazardous environment for workers.

In some electric furnaces known in the art, the high temperature created by the electrodes may unduly heat the roof. Additionally, the high voltage running through the electrodes may cause risk of electrocution for workers working near the roof.

The present invention generally addresses certain drawbacks of metallurgical furnaces known in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In some embodiments, the present invention seeks to provide a metallurgical furnace having a refractory with an expandable segmented outer steel shell, to allow the refractory to expand and contract with thermal cycling of the furnace. In some embodiments, the present invention seeks to provide a metallurgical furnace having a vertical compression member in communication with the refractory, to allow the refractory to expand and contact vertically with thermal cycling of the furnace. In some other embodiments, the present invention seeks to provide a metallurgical furnace having an insulated roof. In some further embodiments, the present invention seeks to provide isolation of the electrodes. In some additional embodiments, the present invention seeks to provide external cooling of a furnace. While there exists synergies between the various exemplary embodiments, the embodiments are expected to work with other conventional furnace designs (e.g., conventional brick refractory and/or electrode and/or external cooling system and/or roof designs).

In a first broad aspect, the present invention provides a metallurgical furnace having a refractory, surrounding a furnace space, for dissipating heat when the furnace space is heated, and a force exerting member for contracting a segmented outer shell around the refractory, toward the furnace space, as the refractory contracts when the furnace space is cooling.

The force exerting member may allow the refractory to expand when the furnace space is heated and may exert a compressive force on the refractory as the refractory contracts when the furnace space is cooling. The force exerting member may have at least one cable disposed around an outer surface of the segmented outer shell, and may have a plurality of cable pairs disposed at interval around an outer surface of the segmented outer shell. The cables may have a tension member mounted thereto for adjusting the length of the cable, thereby adjusting the tension of the tension member and the force exerted by the cable.

In another aspect, the force exerting member may be a plurality of pressing members disposed around an outer surface of the segmented outer shell, each pressing member for pressing against the outer surface and thereby exerting a compressive force thereon. The pressing members may be spring members, may be biased against the outer surface of the segmented steel shell by biasing members, and may be adjustable to apply greater or lesser compressive force on the segmented outer shell.

In another aspect, the furnace may have at least one tension member, which may be a spring, mounted to the force exerting member for exerting tension on the force exerting member, thereby exerting the compressive force. The force exerting member may be supported on at least one support member, or may be supported on a plurality of support members which may be vertical columns, for example buckstay columns, disposed around the segmented outer shell. The positioning member may allow for movement of the segmented outer shell relative to the force exerting member. The force exerting member may engage at least one positioning member, and the positioning member may be a wheel member pivotally mounted to the support member.

In another aspect, the furnace may have at least one force adjustment member connected to the force exerting member, for initially adjusting the force exerted by the force exerting member. At least one force measuring member may be connected to the tension member, which may be a dynamometer for measuring the tension of a spring, for measuring the tension of the tension member and thereby measuring the force exerted by the force exerting member.

In another aspect, the refractory may be radially symmetric in cross-section at at least one point along its height, and may be generally round in cross-section at at least one point along the refractory's height. The segmented outer shell may be generally cylindrical in shape in a contracted configuration when the furnace space is cooled, and may have at least one gap between horizontally adjacent shell segments in an expanded configuration when the furnace space is heated.

In another aspect, the furnace may have one or more sealing members for sealing a gap between horizontally adjacent shell segments in an expanded configuration when the furnace space is heated. The sealing members may be strips for placement between the refractory and the outer shell at a position for sealing at least one gap between horizontally adjacent shell segments in an expanded configuration when the furnace space is heated.

In another aspect, the refractory may have an innermost layer of thermally conductive bricks disposed around the furnace space for absorbing and dissipating the heat. The refractory may also have at least one additional layer of thermally conductive bricks disposed around the innermost layer of thermally conductive bricks, for further absorbing and dissipating heat. The additional layer may include bricks made of a different material than bricks of innermost layer. Some of the thermally conductive bricks may include a periclase material. The refractory may also have an outermost layer of bricks disposed around the one or more layers of thermally conductive bricks, which may be made of a graphite material.

In another aspect, prior to the furnace space being initially heated, the furnace may have at least one layer of spacer material between the innermost and the least one additional layer of thermally conductive bricks, thereby resulting in a refractory diameter larger than a contracted configuration of the shell. The spacer material may be made of a material adapted to combust or dissipate when the furnace space is heated, thereby leaving space to compensate for additional space occupied by expanding thermally conductive bricks.

In another aspect, the segmented outer shell of the furnace may have at least three segments, may have a smaller or larger number of segments proportionate with the relative size of the furnace, and may have eight or more segments. Each segment of the segmented outer shell may have an edge which is adapted to cooperate with an edge of an adjacent shell segment.

In another aspect, the furnace may have one or more sealing members for placement between the segmented outer shell and the refractory, each sealing member for sealing one or more gaps formed between horizontally adjacent shell segments in an expanded configuration when the furnace space is heated.

In another aspect, the furnace may have one or more retaining members for movably connecting pairs of horizontally adjacent shell segments, each retaining member thereby providing a maximum gap distance between each connected pair of horizontally adjacent shell segments.

In a second broad aspect, the present provides a method of adapting a metallurgical furnace having a refractory surrounding an inner furnace space for dissipating heat when the furnace space is heated, and having a contiguous outer shell surrounding the refractory. The method may include the steps of dividing the outer shell into a segmented outer shell, and disposing at least one force exerting member around the refractory, the force exerting member for contracting the segmented outer shell, toward the furnace space, as the refractory contracts when the furnace space is cooling.

In another aspect, the force exerting member may allows the refractory to expand when the furnace space is heated, and may exert a compressive force on the refractory as the refractory contracts when the furnace space is cooling. The force exerting member may include a cable disposed around an outer surface of the segmented outer shell.

In another aspect, the method may include a step of replacing the refractory with at least one inner layer of thermally conductive bricks surrounding the inner furnace space, and with at least one outer layer of bricks surrounding the one or more inner layers. The inner layer may include periclase, alumina, silica or chrome-based bricks, and the outer layer may include graphite bricks In another aspect, the method may include a step of mounting at least one tension member, which may be a spring, to the force exerting member for maintaining the force exerting member under tension.

In another aspect, the method may include a step of supporting the force exerting member on at least one support member, which may be a vertical column, disposed around the segmented outer shell.

In another aspect, the method may include a step of engaging the force exerting member with at least one positioning member, the positioning member for allowing movement of the segmented outer shell relative to the force exerting member. The positioning member may be a wheel member pivotally mounted to the vertical column.

In another aspect, the method may include a step of connecting at least one force adjustment member to the force exerting member for adjusting the force exerted by the force exerting member. The method may further include a step of adjusting the length of the force exerting member with the force adjustment member, thereby adjusting the tension of the tension member and the force exerted by the cable, and may also include a step of connecting at least one force measuring member to the tension member and measuring the force exerted by the force exerting member.

In another aspect, where the force exerting member includes a cable and the force adjustment member is for adjusting the length of the cable, thereby adjusting the tension of the tension member and thus the force exerted by the cable, the force measuring member may be a dynamometer, for measuring the force exerted by the cable.

In another aspect, the method may include a step of disposing at least one layer of spacer material between the thermally conductive bricks of the same layer of refractory, thereby resulting in a diameter of the refractory larger than a contracted configuration of the shell, wherein the spacer material includes a material adapted to combust or dissipate when the furnace space is heated, thereby leaving space to compensate for additional space occupied by expanding thermally conductive bricks.

In another aspect, the method may include a step of dividing the outer shell into at least three segments, at least eight segments, and/or into a smaller or larger number of segments proportionate with the relative size of the furnace.

In another aspect, the method may include a step of providing one or more sealing members between the segmented outer shell and the refractory, each sealing member for sealing one or more gaps formed between horizontally adjacent shell segments in an expanded configuration when the furnace space is heated.

In another aspect, the method may include a step of movably connecting one or more pairs of horizontally adjacent shell segments, thereby providing a maximum gap distance between each connected pair of horizontally adjacent shell segments.

In a third broad aspect, the present provides a force exerting member for use in a metallurgical furnace having a refractory, surrounding a furnace space of the furnace, for dissipating heat when the furnace space is heated. The force exerting member has a surrounding structure for surrounding a segmented outer shell around the refractory, and has at least one tension member, which may be a spring and which may be connected to an initial tension adjuster for initially adjusting the force exerted by the force exerting member, for exerting force on the surrounding structure for contracting the segmented outer shell around the refractory, toward the furnace space, as the refractory contracts when the furnace space is cooling.

In another aspect, the initial tension member is for adjusting the force exerting member's length. The force exerting member may be mounted to a force adjustment member, which may be a dynamometer, for measuring the force exerted by the force exerting member.

In a fourth broad aspect, the present invention provides a metallurgical furnace including a refractory, which may be made of a plurality of bricks surrounding the furnace space, surrounding a furnace space for dissipating heat when the furnace space is heated and a vertical compression member exerting a compressive force upon the refractory, thereby vertically compressing the refractory as the refractory contracts when the furnace space is cooling. The vertical compression member(s) may be one or more springs.

In another aspect, the vertical compression member may be further for allowing expansion of the refractory expands when the furnace space is heated.

In another aspect, the refractory may include a first layer of bricks surrounding the furnace space and a second layer of bricks surrounding the first layer of bricks.

In another aspect, the furnace may include one or more force transfer members for transferring the force exerted by the vertical compression member to one or more of the bricks in the layers. The force transfer member may be a covering member for transferring the force exerted to a layer of bricks.

In another aspect, the first layer of bricks may not be anchored to the second layer of bricks.

In another aspect, the vertical compression member may include a force adjusting member for adjusting the force exerted thereby. The vertical compression member may also be mounted to a suspension member, which in turn may be mounted to a supporting member. The suspension member may be movably mounted to the supporting member, to permit movement of the suspension members to accommodate contraction and/or expansion of the refractory. The furnace may also include one or more length adjusting members for adjusting the length of each suspension member, thereby adjusting the force exerted by the vertical compression member.

In another aspect, the refractory is adapted to compensate for a greater expansion of an inner portion of the refractory as compared with that of an outer portion of the refractory when the refractory is heated by the furnace space. The refractory may include at least one layer of bricks surrounding the refractory, and the layer of bricks may include at least one brick having a greater vertical height on an outer face as compared with that of an inner face, to compensate for the greater expansion of the inner face as compared with that of the outer face when the brick is heated by the furnace space.

In a fifth broad aspect, the present invention provides a method of adapting a metallurgical furnace including a refractory, the refractory surrounding a furnace space and for dissipating heat when the furnace space is heated and optionally including a plurality of bricks surrounding the furnace space. The method includes a step of disposing a vertical compression member against the refractory for vertically compressing the refractory as the refractory contracts when the furnace space is cooling and/or for accommodating for vertical expansion of the refractory when the furnace is heating. The refractory may include a first layer of bricks surrounding the furnace space and a second layer of bricks surrounding the first layer of bricks.

In another aspect, the method may include a step of disposing one or more force transfer members between the vertical compression member and the refractory, the force transfer member, which may be a covering member for transferring the force to at least one of the layers of bricks, and is for transferring force exerted by the vertical compression member, which may be a spring, to one or more of the bricks in the layers.

In another aspect, the first layer of bricks may not be anchored to the second layer of bricks.

In another aspect, the vertical compression member may include a force adjusting member for adjusting the force exerted.

In another aspect, the method may include a step of mounting the vertical compression member to a suspension member, which may in turn be mounted to a supporting member.

In another aspect, the method may include a step of movably mounting the suspension member to the supporting member, to thereby permit movement of the suspension members to accommodate at least one of contraction or expansion of the refractory.

In another aspect, the method may include a step of mounting one or more length adjusting members to the suspension member, and adjusting the length of the suspension member with the length adjusting member, thereby adjusting the force exerted by the vertical compression member.

In another aspect, the method may include a step of adapting the refractory to compensate for greater expansion of an inner portion of the refractory as compared with that of an outer portion of the refractory when the refractory is heated by the furnace space.

In another aspect, the method may include a step of adapting at least one brick in the refractory to have a greater vertical height on an outer face as compared with that of an inner face, to compensate for greater expansion of the inner face as compared with that of the inner face when the brick is heated by the furnace space.

In a sixth broad aspect, the present invention provides a system for cooling a metallurgical furnace, the system including an outer sleeve surrounding a layer of air heated by an inner furnace space of the furnace, and including one or more air displacement members for displacing the heated surrounding air away from the furnace.

In another aspect, the displacement member may be for drawing cooler air into the outer sleeve by displacing the heated surrounding air away from the furnace.

In another aspect, cooler air may be drawn into the outer sleeve by the one or more air displacement members.

In another aspect, the heated surrounding air may be drawn away from the furnace by the one or more air displacement members.

In another aspect, the outer sleeve may include one or more apertures for allowing air to pass therethrough.

In another aspect, the system may include one or more spray nozzles for spraying liquid coolant, from within the layer of air, toward an outer surface of the furnace. The spray nozzles may include an atomizer for atomizing the liquid coolant into a mist and for spraying the mist toward the outer surface of the furnace.

In another aspect, the system may include a monitor for monitoring accumulation of liquid coolant.

In another aspect, the system may include a regulator for reducing a liquid coolant spraying rate in response to accumulation of liquid coolant.

In another aspect, the outer sleeve may include a plurality of sleeve segments. Each sleeve segment may corresponds with a segment of a steel shell surrounding a refractory of the metallurgical furnace, and each sleeve segment and corresponding shell segment may be for collectively surrounding a volume of heated air from the layer of air to be displaced away from the furnace.

In a seventh broad aspect, the present invention provides a method of cooling a metallurgical furnace, including the steps of displacing air heated by an inner furnace space of the furnace away from the furnace with one or more air displacement members, the heated air being surrounded by an outer sleeve thereby forming a layer of heated air surrounding the furnace.

In another aspect, the method may include a step of spraying cooling liquid, from within the layer of air, toward the outer surface of the furnace.

In another aspect, the method may include a step of atomizing the cooling liquid to be sprayed toward the outer surface of the furnace.

In another aspect, the method may include a step of regulating the spraying of the cooling liquid in response to detected levels of cooling liquid at a lower surface of the furnace.

In another aspect, the outer sleeve may include a plurality of sleeve segments. Each sleeve segment may correspond with a segment of a steel shell surrounding the refractory of the metallurgical furnace, each sleeve segment and corresponding shell segment being for collectively surrounding a volume of heated air from the layer of air to be displaced away from the furnace.

In an eighth broad aspect, the present invention provides a roof for a metallurgical furnace, including a roof member having suspension members extending through an outer surface, the suspension members supporting an inner mesh of the roof member, the inner mesh supporting insulating material, which may be castable, and which may be non-conductive, and/or a thermal insulating material, and/or which may be non-reactive with water. The insulating material may be a high alumina castable material, the insulating material has a thickness of greater than 40 cm.

In another aspect, the outer surface may form an open ended external copper cap.

In another aspect, the roof may include a plurality of roof members dimensioned to fit together to form the roof.

In another aspect, the upper surface of the roof may be dimensioned to allow liquid coolant dispersed thereon to flow outwardly toward a periphery of the roof, and may be dimensioned to contain a layer of the liquid coolant thereon. The liquid coolant may be for cooling the roof and/or for providing a liquid seal on the roof to prevent gas escape from an inner space of the furnace.

In another aspect, the roof may include a contiguous trough for containing the liquid coolant, thereby allowing formation of the layer of the liquid coolant having a target depth to form on the upper surface of the roof. The trough may include an outer wall that is higher than an inner wall, to allow the formation of the layer of the liquid coolant having the target depth to form on the upper surface of the roof.

In another aspect, the roof may include a framework supported by the suspension members, the framework supporting the inner mesh. The framework may be made partly or entirely of rebar, and the inner mesh may be made partly or entirely of steel mesh.

In another aspect, the roof may include a pump for dispersing and/or circulating the liquid coolant onto the roof.

In another aspect, the roof may include an elastic member for maintaining a seal between the roof and an upper surface of the metallurgical furnace.

In another aspect, at least one gap between adjacent roof members of the plurality of roof members may be sealed with a sealant, which may be cement, tar, high temperature silicon sealant, or any combination thereof, to prevent flow of fluids through the gap.

In another aspect, the roof may include at least one opening to accommodate at least one feed pipe.

In another aspect, the roof may include a copper cylinder extending into the furnace space at one end and extending beyond a target liquid coolant height at a second end, the copper cylinder surrounding the feed pipe and sealingly joined thereto.

In a ninth broad aspect, the present invention provides a metallurgical furnace for smelting minerals including a refractory, surrounding a furnace space, for dissipating heat when the furnace space is heated. The refractory includes an inner layer having a heat dissipation thickness, and the inner layer include a first plurality of bricks of a first type having the heat dissipation thickness, and a second plurality of bricks of a second type having a sacrificial thickness greater than the heat dissipation thickness, the second plurality of bricks protruding towards the furnace space. The sacrificial thickness may be determined from a predictable consistency of molten slag formed during use of the metallurgical furnace for smelting minerals, and may be determined from a predictable consistency of the molten metal during use of the metallurgical furnace for smelting minerals.

In another aspect, the sacrificial thickness may vary along the height of the refractory according to differing properties of material within the refractory at varying heights.

In another aspect, the first plurality of bricks and the second plurality of bricks may be staggered independently throughout the refractory, and may be staggered uniformly throughout the refractory, and may be staggered uniformly throughout the refractory forming a honeycomb shape.

In a tenth broad aspect, the present invention provides a method of modifying an existing refractory in a metallurgical furnace for smelting minerals, wherein the existing refractory surrounds a furnace space, for dissipating heat when the furnace space is heated. The method includes the steps of providing an inner refractory layer within the existing refractory, the inner refractory layer having a heat dissipation thickness, and the inner refractory layer including a first plurality of bricks of a first type having the heat dissipation thickness, and including a second plurality of bricks of a second type having a sacrificial thickness greater than the heat dissipation thickness, the second plurality of bricks protruding towards the furnace space.

In another aspect, the method includes step(s) of determining the sacrificial thickness from a predictable consistency of molten slag formed during use of the metallurgical furnace for smelting minerals, and/or determining the sacrificial thickness from a predictable consistency of the molten metal during use of the metallurgical furnace for smelting minerals.

In another aspect, the method includes the step of arranging the first plurality of bricks and the second plurality of bricks in a staggered manner throughout the refractory, and/or a uniformly staggered manner throughout the refractory, and/or in a uniformly staggered manner throughout the refractory, thereby forming a honeycomb shape.

In an eleventh broad aspect, the present invention provides an electrode seal for use in a metallurgical furnace. The furnace includes a furnace space heated by electrodes extending through an aperture into the furnace space, and the seal includes at least three sets of shoes in consecutive lateral contact, each shoe having a biasing member, which may be a spring, which may further be replaceable, and which may also be adjustable to provide greater or less bias, for biasing a surface of the shoe towards one of the electrodes thereby allowing the one electrode to longitudinally move within the electrode seal while providing electrical insulation between the electrode and the aperture.

In another aspect, the at least three set of shoes provide a gap around the electrode to allow for a free lateral movement of that electrode.

The biasing member may be adjustable to provide greater or less bias, with one end pressed upon the cooper shoe and the other end against an adjustable bronze screw. The biasing member may be electrically insulated on both ends, e.g., with plastic discs which are against copper shoe on one end and against the copper screw on the other.

The at least three sets of shoes may also comprise a first layer of ceramic inner shoes and a second layer of copper outer shoes, the two layers of shoes forming a circle and an inner diameter of the circle being greater than the electrode thereby providing a gap therebetween.

The at least three sets of shoes may also be drilled through evenly distributed holes from outside to inside.

In another aspect, the at least three sets of shoes allow for a lateral movement of the one electrode therewithin while maintaining the electrical insulation.

In another aspect, the seal may include electrical insulating material packed around an electrode above the at least three shoes, and the electrical insulating material may be ceramic wool.

In another aspect, the seal may include using a chamber surrounding the shoes for containing pressurized electrically inert gas, for providing a pressurized seal for preventing gas escape from the furnace space. The pressurized gas may penetrate through the holes in the shoes and thereby be distributed around the electrode evenly to push down along the electrode in order to contribute to preventing the furnace gas and dusts from within the furnace space flowing through the gap around the electrode, in turn, thereby preventing at least some of the gas from leaking and preventing at least some substance attached to the electrode from hindering vertical movement of the electrode.

In another aspect, the seal may include an electrically insulated cooling member surrounding an electrode. The cooling member may include a cast copper plate, which may be protected from underneath by a durable insulating material, which may be a castable material, for example a high alumina castable material.

In another aspect, the cast plate may define a contiguous inner channel for directing cooling fluid flowing therethrough.

In another aspect, the cooling member may include a copper plate.

In another aspect, the chamber may be at least partly defined by the cooling member.

In a twelfth broad aspect, the present invention provides a metallurgical furnace including a refractory, surrounding a furnace space, for dissipating heat when the furnace space is heated. The refractory includes an inner layer having a heat dissipation thickness, the inner layer includes a first plurality of bricks of a first type having the heat dissipation thickness, and a second plurality of bricks of a second type having a sacrificial thickness greater than the heat dissipation thickness, the second plurality of bricks protruding towards the furnace space. The furnace also includes a force exerting member for contracting a segmented outer shell around the refractory, toward the furnace space, as the refractory contracts when the furnace space is cooling. The force exerting member includes a surrounding structure for surrounding the segmented outer shell around the refractory, and at least one tension member for exerting force on the surrounding structure for contracting the segmented outer shell around the refractory, toward the furnace space, as the refractory contracts when the furnace space is cooling. The furnace also includes a vertical compression member for exerting a compressive force upon the refractory, thereby vertically compressing the refractory as the refractory contracts when the furnace space is cooling. The furnace also includes a cooling system for cooling the metallurgical furnace, the cooling system including an outer sleeve surrounding a layer of air heated by an inner furnace space of the furnace, and one or more air displacement members for displacing the heated surrounding air away from the furnace. The furnace also includes a roof, including a roof member having suspension members extending through an outer surface of the roof member, the suspension members supporting an inner mesh of the roof member, the inner mesh supporting insulating material.

In thirteenth broad aspect, the present invention provides a metallurgical furnace comprising a refractory, surrounding a furnace space, for dissipating heat when the furnace space is heated, the refractory comprising two pairs of planar and opposed walls, each member of at least one pair of walls movable relative to the other member, each wall comprising a segment of a segmented outer shell a plurality of pressing members disposed around an outer surface of the segmented outer shell, each pressing member for pressing against the outer surface and thereby exerting a compressive force thereon, thereby contracting the segmented outer shell around the refractory, toward the furnace space, as the refractory contracts when the furnace space is cooling.

In another aspect, the pressing members allow the refractory to expand when the furnace space is heated and exert a compressive force on the refractory as the refractory contracts when the furnace space is cooling.

In another aspect, the pressing members comprise spring members.

In another aspect, the pressing members are adjustable to apply greater or lesser compressive force on the segmented outer shell.

In another aspect, the pressing members are biased against the outer surface of the segmented outer shell by biasing members.

In another aspect, the biasing members are adjustable to apply greater or lesser bias to the pressing members against the outer shell.

In another aspect, the biasing members are each threaded members for cooperation with a corresponding fixed member, whereby turning the biasing member within the fixed member in results in displacement of the biasing member relative to the outer shell, and results in application of greater or less bias to the pressing members against the outer shell.

In another aspect, the pressing members are supported on two or more support members.

In another aspect, the pressing members are supported on two or more support members which are vertical columns disposed around the segmented outer shell.

In another aspect, the position of two or more of the vertical columns is fixed.

In another aspect, the position of each of the vertical columns is fixed.

In another aspect, the vertical columns comprise first and second vertical ends, and are fixed in position at at least one of the first end and second vertical ends.

In another aspect, the vertical columns are buckstay columns.

In another aspect, the pressing members are biased against the outer surface of the segmented steel shell by biasing members, and wherein one or more of the biasing members is supported by one or more of the vertical columns, or by horizontal beams fixed by two vertical columns at both ends.

In another aspect, the refractory comprises an innermost layer of thermally conductive bricks disposed around the furnace space for absorbing and dissipating the heat.

In another aspect, the refractory further comprises at least one additional layer of thermally conductive bricks disposed around the innermost layer of thermally conductive bricks, for further absorbing and dissipating the heat.

In another aspect, the additional layer comprises bricks comprising a different material than bricks of innermost layer.

In another aspect, at least some of the thermally conductive bricks comprise periclase.

In another aspect, the refractory further comprises an outer layer of bricks disposed around the one or more layers of thermally conductive bricks.

In another aspect, the outer layer of bricks comprises a graphite material.

In another aspect, the refractory comprises at least one gap at a corner between adjacent walls in an expanded configuration when the furnace space is heated.

In another aspect, the furnace further comprises one or more sealing members for sealing the at least one gap at the corner between adjacent walls in an expanded configuration when the furnace space is heated.

In another aspect, the one or more sealing members are strips for placement between the outer layer of bricks and the one or more layers of thermally conductive bricks at a position for sealing the at least one gap between adjacent walls in an expanded configuration when the furnace space is heated.

In another aspect, the refractory, prior to the furnace space being initially heated, comprises at least one layer of spacer material between the innermost and the least one additional layer of thermally conductive bricks, thereby resulting in a refractory diameter larger than a contracted configuration of the shell, and wherein the spacer material is made of a material adapted to combust or dissipate when the furnace space is heated, thereby leaving space to compensate for additional space occupied by expanding thermally conductive bricks.

In another aspect, the segmented outer shell comprises at least four segments, each of the four segments corresponding with each of the four walls.

In another aspect, each segment of the segmented outer shell comprises an edge which is adapted to cooperate with an edge of an adjacent shell segment.

In another aspect, one or more segments of the segmented outer shell comprise a flange mounted perpendicularly to a lower edge of the segment, the flange for supporting the segment vertically.

In another aspect, the furnace comprises an outer layer of bricks disposed around the one or more layers of thermally conductive bricks, and wherein the flange provides support for the outer layer of bricks.

In another aspect, the pressing members are biased against the outer surface of the segmented steel shell by biasing members, and one or of the biasing members is supported by one or more of the vertical columns, and further, the biasing members are threaded members for cooperation with a corresponding fixed member, whereby turning a biasing member within the fixed member in results in displacement of the biasing member relative to the outer shell, and results in application of greater or less bias to the pressing members against the outer shell, where the pressing members are biased against the outer surface of the segmented steel shell by the biasing members, and where each fixed member is supported by one or more of the vertical columns.

In a fourteenth broad aspect, the present invention provides a method of adapting a metallurgical furnace comprising a refractory surrounding an inner furnace space, the refractory comprising a pair of opposed walls, the refractory for dissipating heat when the furnace space is heated, and comprising a contiguous rectangular-in-cross-section outer shell surrounding the refractory, the method comprising dividing the outer shell into a segmented outer shell comprising four planar segments and disposing pressing members around the refractory, the pressing members for contracting the segmented outer shell, toward the furnace space, as the refractory contracts when the furnace space is cooling.

In another aspect, the pressing members allow the refractory to expand when the furnace space is heated and exerts a compressive force on the refractory as the refractory contracts when the furnace space is cooling.

In another aspect, the pressing members comprise spring members biased against the segmented outer shell.

In another aspect, the method further comprises replacing the refractory with at least one inner layer of thermally conductive bricks surrounding the inner furnace space, and with at least one outer layer of bricks surrounding the one or more inner layers.

In another aspect, the method further comprises disposing at least one layer of spacer material between the thermally conductive bricks of the same layer of refractory, thereby resulting in a diameter of the refractory larger than a contracted configuration of the shell, wherein the spacer material comprises of a material adapted to combust or dissipate when the furnace space is heated, thereby leaving space to compensate for additional space occupied by expanding thermally conductive bricks.

In another aspect, the method further comprises providing a sealing member at a corner between adjacent walls, each sealing member for sealing one or more gaps formed between the adjacent walls in an expanded configuration when the furnace space is heated.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figures 1, 1A:
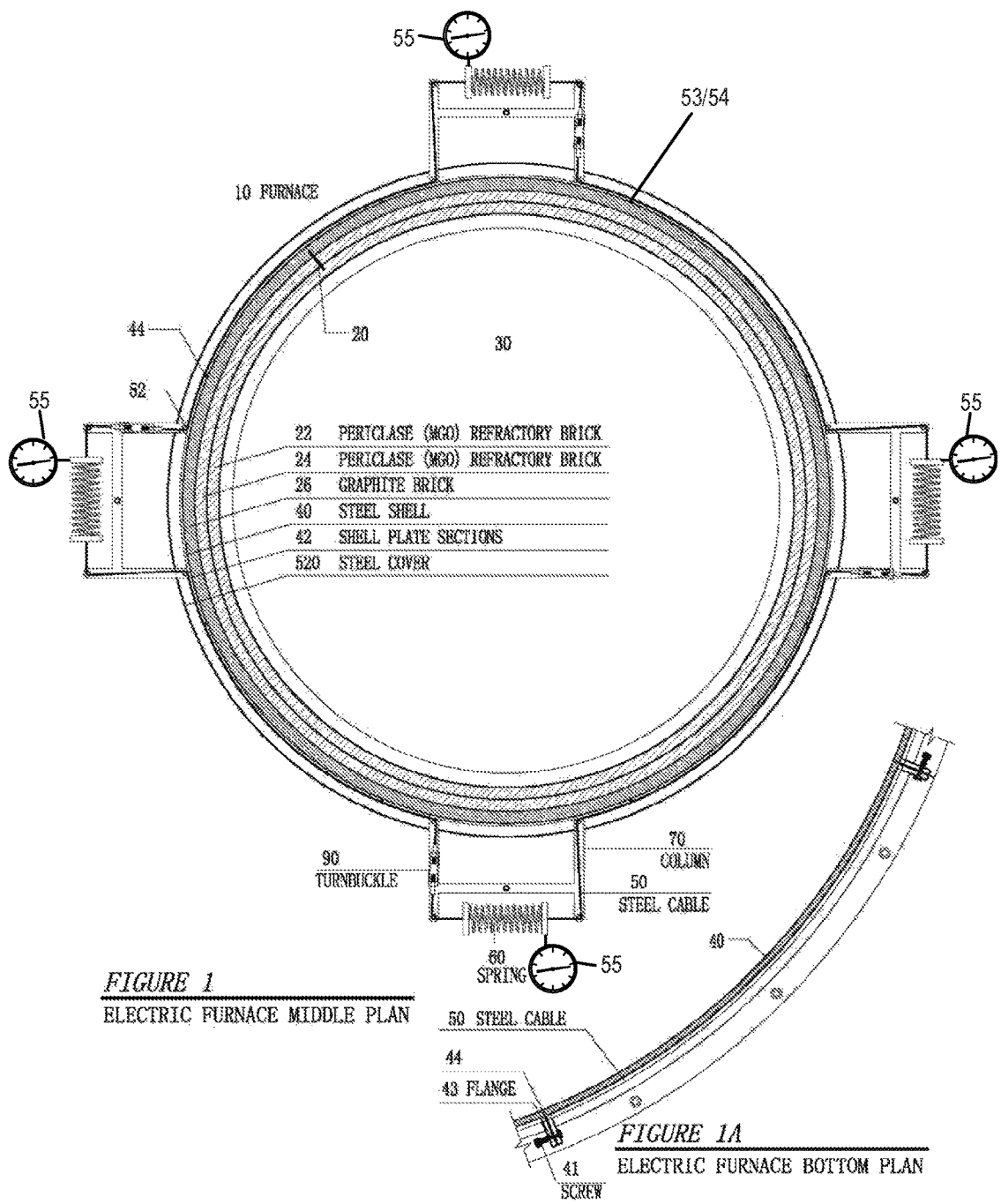
FIG. 1 is a horizontal cross-sectional view depicting an exemplary metallurgical furnace of the present invention.
FIG. 1A is a horizontal cross-section view partly depicting a lower portion of an outer shell and related components of an exemplary metallurgical furnace of the present invention.

Different embodiments address different aspects of the furnace design. It will be understood that not all of the different aspects of the furnace design discussed herein are required for at least some drawbacks known in existing designs to be addressed. In some cases, single aspects described herein may independently address at least certain known drawbacks. While there exist synergies between the various exemplary embodiments, the embodiments are expected to work with other conventional furnace designs (e.g., conventional brick refractory and/or electrode and/or external cooling system and/or roof designs).

A brick refractory may be made of multiple lateral, or radial, layers of bricks, placed adjacent to one another. Individual layers may be made to interlock, which may provide additional stability. During use, the heating of the brick refractory causes thermal expansion of the bricks. In order to compensate for this expansion, there may be expansion papers placed between the individual horizontal, and/or vertical, layers of bricks prior to first use of the furnace therewith. Once heated, these papers burn, providing space for the layers of brick to expand in both horizontal and vertical axes. Between the outermost layer of bricks and an outer steel shell, some furnaces may have a layer of expansion board. This layer is elastic in nature, and is intended to allow the outermost layer of bricks to expand without pressing upon the inside surface of the steel shell, thus minimizing stress to the brick refractory.

When exposed to numerous cycles of furnace heating and cooling, the bricks may present flaws. For example, when the expansion papers have burned away, they cannot be easily replaced prior to further heating cycles. Thus, further cycles of heating and cooling will typically result in gaps between the bricks, increasing heat escape from the furnace if the ambient air flows around it, as may also result in escape of molten metal from the furnace, into the brickwork of the brick refractory. Additionally, the cycles of expansion and contraction may result in friction and pressure between the bricks, and eventually wearing down and breakdown of the bricks, which may ultimately result in failure of the brick refractory. Additionally, the expansion boards typically used to fill the space between the outer steel shell and the brick refractory have a limited lifespan, and lose their elasticity with each cycle, resulting in space between the brick refractory and the shell. The gaps between the bricks may further result in instability of the brick refractory, which eventually may contribute to the wearing and breakdown of the bricks. The gaps between the bricks are also known to decrease cooling efficiency of some furnaces.

In some examples, each layer of bricks may be staggered and interlocked with respect to the layer immediately above or below. The bricks are bound and held together by the structure defined by an outer steel shell, with all bricks being effectively interlocked together, resulting in an initially strong structure. However, after a series of thermal cycling, the bricks may begin to crack and wear down. For example, since bricks closer to the heated furnace space may become hotter, they may also be subject to greater thermal expansion, as compared with those farther away from the heated furnace space. As these bricks expand vertically, the interlocking manner in which they are laid may result in stress on the expanding bricks. This effect may be more pronounced in cases where furnaces are shut down for longer times and then reheated rapidly.

Brick integrity may be vulnerable when the frozen "skull" layer of slag inside the furnace cracks and forms gaps during cooling, partly as a result of differing densities of different molten materials and solids. In cases where the skull has cracked during cooling and the furnace is rapidly reheated, the likelihood of a furnace "runout", where molten materials leak through the skull and then through spaces in the brick refractory and eventually out of the furnace, is increased.

Above the freeboard, metallurgical furnaces typically have some form of roof. The roof may be partly supported by the furnace itself. The roof may also be supported, in whole or in part, by external supporting means (for example, the structure or building in which the furnace is housed). In use, fumes and dust may deposit on the lower surface of the roof, and these deposits may have a thickness of 10 to 20 cm. The temperature on this lower surface of the roof may reach approximately 1200 to 1600 degrees Celsius during use.

The roof may be made of castable material, which is not conductive to electricity or heat. In some examples, the roof may have a maximum thickness of 10 to 20 cm of high alumina castables, which are suspended by a steel anchor fixed to a water cooled steel panel. The roof aims at to provide thermal insulation for the surrounding environment and/or to provide a barrier to prevent the escape of toxic gases, including carbon monoxide, into the surrounding environment, which contributes to creating a safe environment for workers.

Electrical furnaces typically have one or more electrodes suspended from above the furnace. The high temperature created by the electrodes may heat the surrounding roof area. Additionally, the high voltage running through the electrodes may cause a risk of electrocution for workers working near the furnace roof.

A cooling system may be provided for the furnace using water sprayed, or falling as a film, on an external surface of the furnace. Excess water, however, may pose a safety risk, especially in situations where molten metal escapes from the furnace, e.g., due to an integrity failure in the furnace (commonly referred to as a "run-out").

Reference is now made to the drawings, in which FIG. 1 shows a horizontal cross-section or top view of an exemplary metallurgical furnace 10 in accordance with one embodiment of the present invention. The furnace 10 depicted is round in shape along the horizontal cross-section shown. The section shown is from the "freeboard" space of the furnace. The freeboard space is above the "slag line" in the furnace 10, above which there is typically no molten or solid metal or slag in the furnace during operation. A brick refractory 20 of the furnace 10 at this space may be in direct contact with either fume or dust material from the furnace 10, or in direct contact with heated furnace gas. FIG. 1A shows a horizontal cross-section view partly depicting a lower portion of an outer shell 40 and related components of the exemplary metallurgical furnace depicted in FIG. 1. The furnace 10 is surrounded by an exterior sleeve 520 discussed further below, and is supported by a number of structural columns 70, which may be steel buckstay columns.

Figure 2:
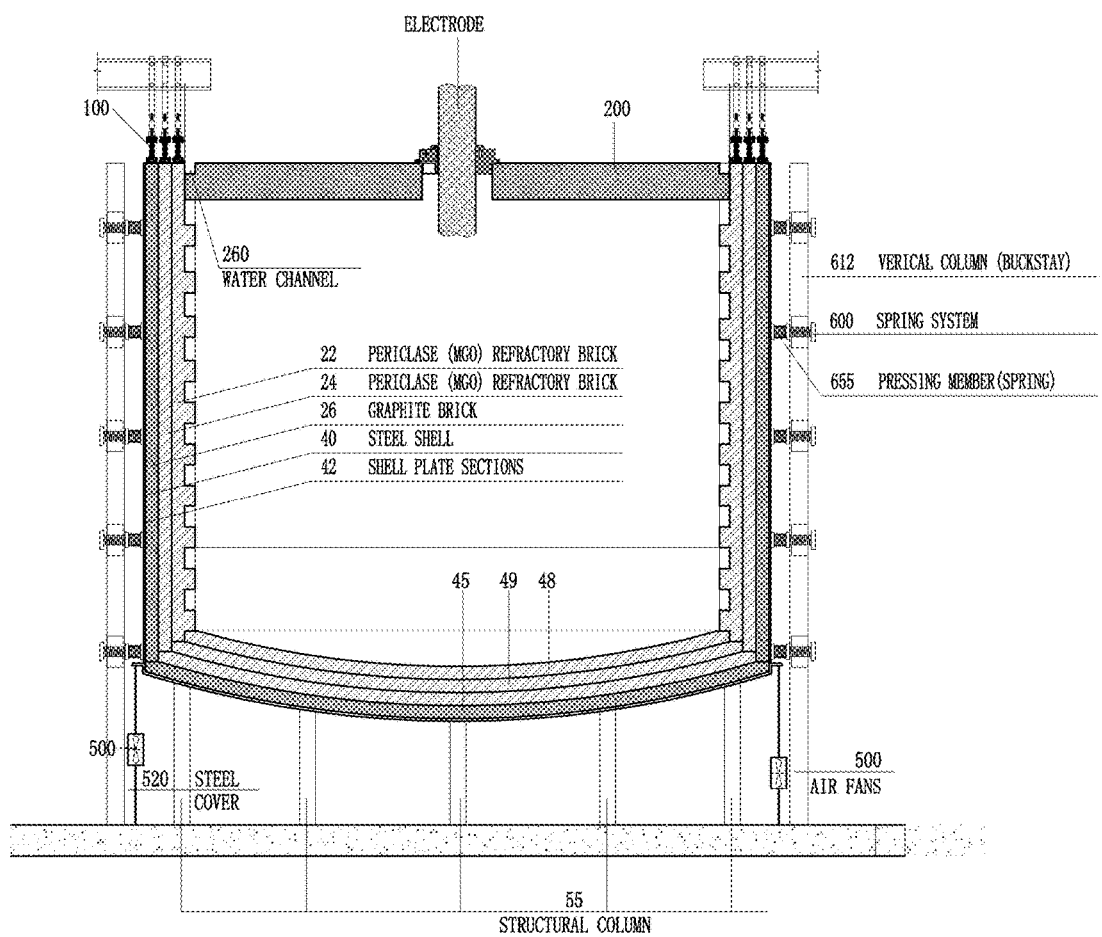
FIG. 2 is a vertical cross-sectional view depicting an exemplary metallurgical furnace of the present invention.

Reference is now made concurrently to FIGS. 1 to 4A. With reference to FIG. 2, the furnace 10 depicted comprises the brick refractory 20 radially surrounding an inner furnace space 30 and the outer shell 40 radially surrounding the brick refractory 20. Below the inner furnace space 30, a brickwork hearth 45 may comprise four layers of brick, which may be periclase bricks (e.g., inner layer(s)) and graphite bricks (e.g., outer layer(s)). Expansion papers or graphite felt layers (not shown) may be placed between these bricks. A steel structure as a segment of a sphere, part of the outer shell 40 and depicted at the bottom, supports the brickwork hearth 45 which contain molten metal or slag, or other materials that are heated or are to be heated in the furnace 10.

Figure 4:
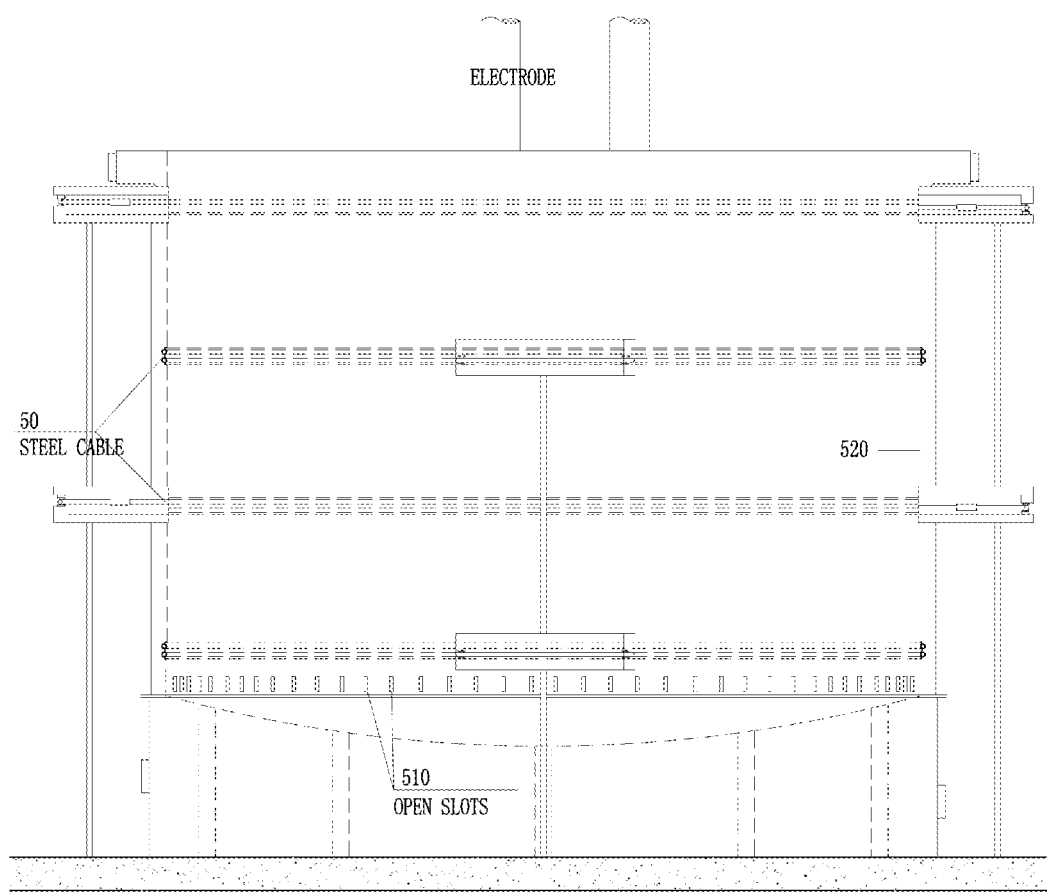
FIG. 4 is an elevational view partly depicting an exemplary metallurgical furnace of the present invention and partly depicting an exemplary cooling system for a metallurgical furnace of the present invention.
Figure 4A:
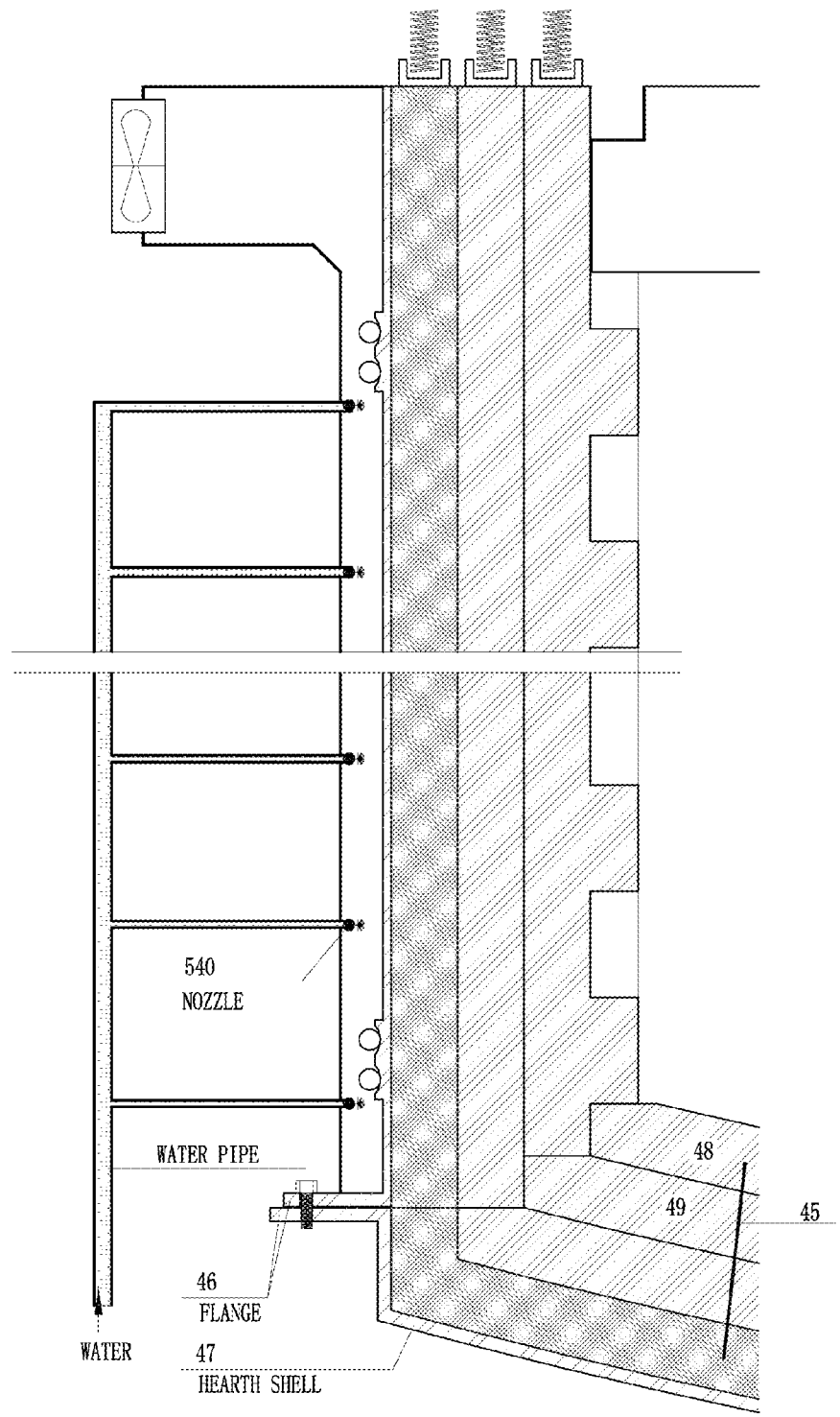
FIG. 4A is a horizontal cross-sectional view depicting a refractory and vertical compression members of an exemplary metallurgical furnace of the present invention, and partly depicting an exemplary cooling system including nozzles for spraying liquid coolant, all for a metallurgical furnace of the present invention.

The furnace 10 depicted in the example of FIG. 2 comprises exterior sleeve 520 discussed further below, and is supported by a number of structural columns 70, and is covered by a roof 200, in which there are openings through which electrodes 400 are shown protruding. The exemplary roof 200 will be described more specifically with reference to FIGS. 6 and 6A. In the example of FIG. 2, the electrodes 400 are radially surrounded by non-conductive shoes 415 and 410, which will be described more specifically with reference to FIGS. 7 to 9. Still with reference to FIG. 2, air displacement members 500 are depicted for use in moving heated air away from an envelope of air surrounding the furnace 10. With reference to FIG. 4 and FIG. 4A, ambient or cooled air is allowed to enter the envelope of air through air ingress apertures 510 in the exterior sleeve 520 to replace the heated air which has been displaced away. Liquid coolant spraying means or mechanism 540 may be used to spray a fine mist of liquid coolant, for example water, onto the exterior steel shell 40 of the furnace 10, thereby cooling the furnace 10, in accordance with certain preferred embodiments of the present invention. In the example of FIG. 4A, the liquid coolant spraying means 540 is organized as an array of water spray nozzles 545. Other configurations could be used without affecting the end result sought (e.g., one or more mister positioned along columns 70). The liquid coolant spraying means 540 may be configured to spray water at a fixed volume or at a variable volume. The liquid coolant spraying means 540 may be configured to monitor the temperature of the exterior sleeve 520 and adjust the volume and/or spray time considering the temperature. The liquid coolant spraying means 540 may further comprise a water detector (not shown) that transmits an alarm and/or shuts the system off when water is detected to be accumulating. The liquid coolant spraying means 540 may further comprise a thermometer and a hygrometer (not shown) that monitor the temperature and humidity of the air at one or more specific locations (not shown) around the exterior sleeve 520 and adjusts the volume and/or spray time in accordance therewith. In preferred embodiments, the surface of the shell 40 and the surrounding air as measured from within the sleeve 520 may not exceed temperatures of 80 C during use, and the air temperature may be lower than that of the surface of the shell 40, while maximum air humidity may be at or around 100% at 80 C.

In the example of FIGS. 1, 2 and 4, the brick refractory 20 is comprised of an inner layer of brick 22 radially surrounding the inner furnace space 30, a second layer of brick 24 radially surrounding the inner layer 22, and an outer layer of brick 26, radially surrounding the second layer 24. In other embodiments, one, two, three, or more layers of brick may be used. The number of layers may vary depending on the molten materials inside the furnace 10 during use.

The layers of bricks may be of varying thickness, e.g., radially increasing thickness, which may be particularly suited for use cases where greater pressures are expected to be exerted on the brick refractory 20 during use, or for uses where the contained materials have a relatively low thermal conductivity for solidified skull.

In preferred embodiments, in order to facilitate locking of a slag "skull" onto the brick refractory 20, the hot (i.e., inner) face of the innermost layer 24 of periclase brick 22 may be formed with different thickness of bricks. In further preferred embodiments, bricks of differing thicknesses may be arranged in a staggered form, to provide a honeycomb-like shaped refractory interior as depicted in FIGS. 2, 2A, 2B and 4A. In some embodiments, only the inner face of the bricks in the slag area are in such arrangement.

Figure 2A:
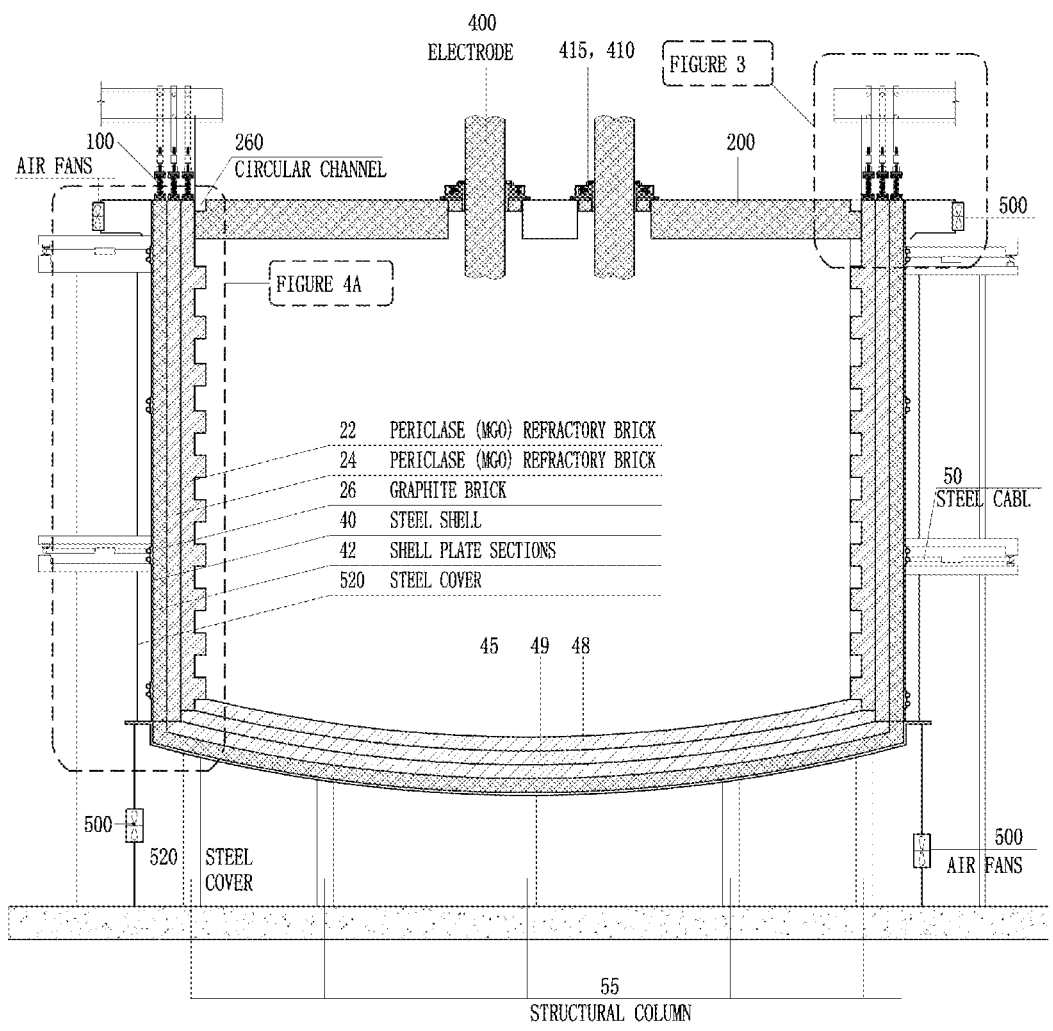
FIG. 2A is a vertical cross-sectional view depicting an alternative exemplary metallurgical furnace of the present invention.
Figure 2B:
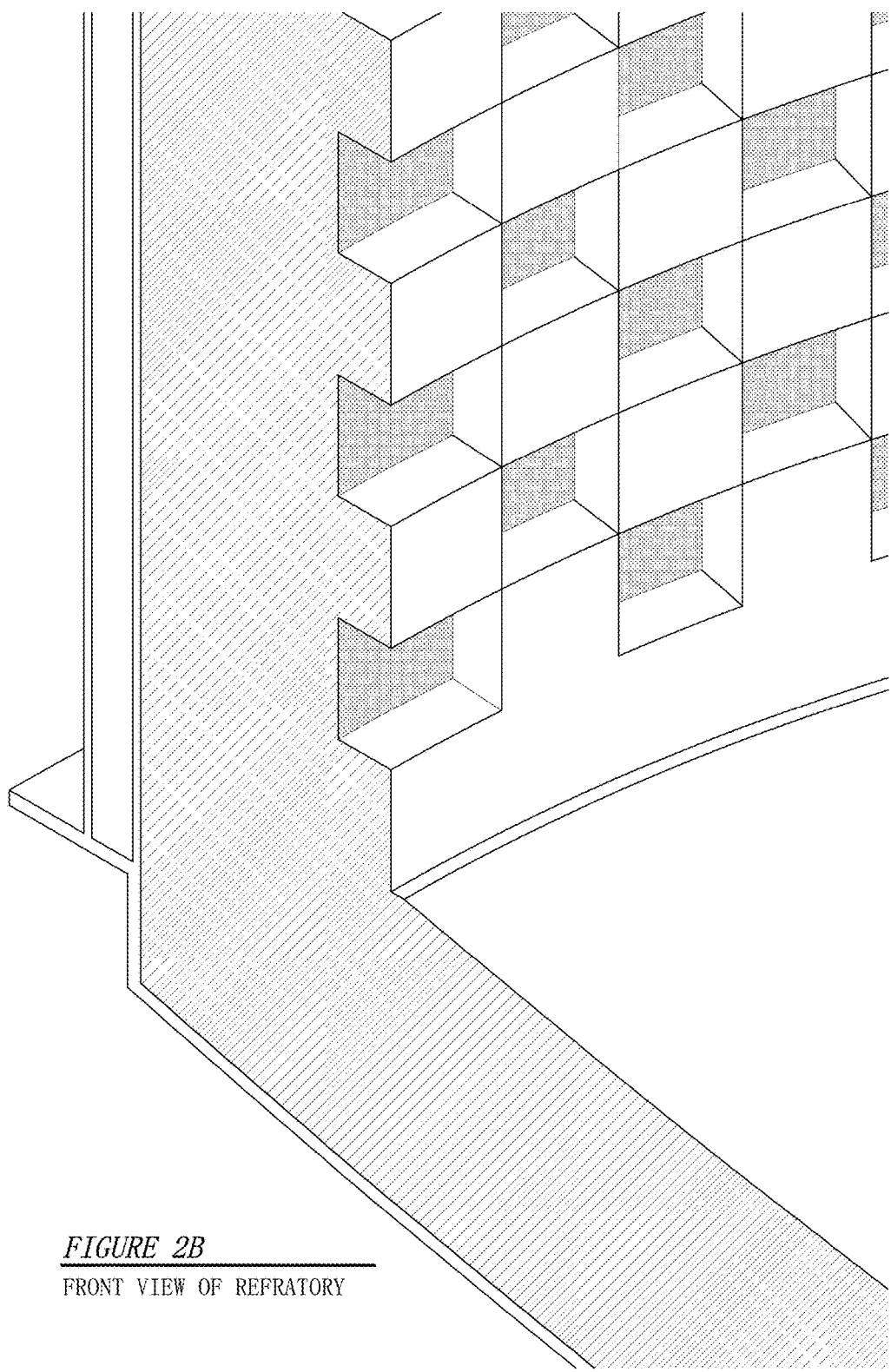
FIG. 2B is an elevational view partly depicting an inner surface of a refractory of an exemplary metallurgical furnace of the present invention.

In use, for example at start-up of a metallurgical furnace having a new refractory of the type of the refractory 20, a refractory wherein the innermost layer 22 comprises bricks of differing thicknesses, for example in a honeycomb-like formation as depicted in FIG. 2A or 2B, may allow hot slag and/or molten metal, as well as dust and other materials at the freeboard space, to adhere or freeze, as appropriate, to the inner-facing surface of the refractory. The innermost surface of the bricks having the greatest thickness 2200 may, during use, be corroded or broken down by chemical or mechanical action, although the overall integrity and strength of the refractory is not compromised. Accordingly, these innermost portions of these thickest bricks 2200 may be considered to be "sacrificial". In order to reduce possibly corrosion of the surface of these bricks, initially a layer of castables which may be approximately 50 mm thick, and which may be made of magnesium oxides, may be casted on top of all the interior surface of refractory which may form a staggered or in "honeycomb" shape.

In preferred embodiments, the inner 22 and second 24 layers of bricks may comprise bricks made of a thermally conductive material, for absorbing and dissipating heat from molten metal and slag, and from heated furnace gas, all inside of the furnace. Other materials such as chrome based refractory are suitable for nonferrous ore smelting. Mag-graphite refractory is also suitable for ferrous ore smelting. Silica and alumina based refractory may also be suitable depending on the properties of the contained materials. In further preferred embodiments, these layers may comprise a magnesium oxide, or periclase, material for titaniferrous ore (e.g. ilmenite) smelting. The outer layer 26 of brick may comprise a graphite material. One or more outer layers 26 having high thermal conductivity may provide an advantageous benefit, e.g., in cases where molten materials leak through the inner refractory layers 22 and 24. As the outer layer 26 may be at a similar temperature to that of the steel shell 40, it may advantageously cause the leaked materials to cool and solidify rapidly, preventing a runout. In such cases, the outer layer 26 may function as an extension of the steel shell 40 thermally, but with a much higher resistance to the hot molten materials.

In preferred embodiments, the outer layer 26 of bricks will comprise graphite-containing bricks. The graphite brick thickness may vary between 150 to 300 mm, depending on the furnace 10 power level. For example, the graphite bricks may have a size of 150 mm×230 mm×100 mm. The physical size of a brick to be used may vary depending on its weight for ease of transport and use. As an example, a first layer of the graphite bricks is laid from the bottom to the top with the 100 mm side vertically, 150 mm side laterally and 230 mm side radially. These bricks may be staggered in the vertical direction, and laid directly upon one another vertically without any expansion paper or cement of any kind.

Figure 3:
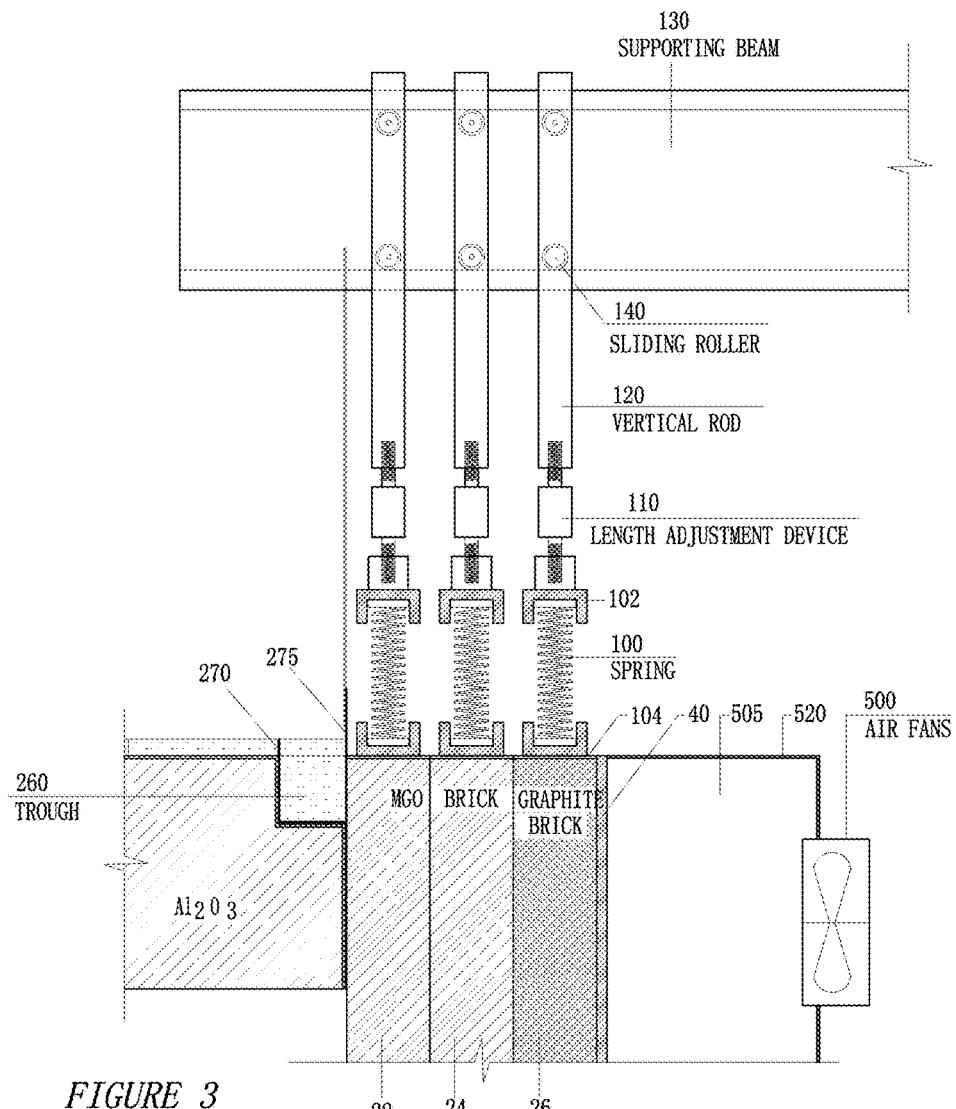
FIG. 3 is a vertical cross-sectional view partly depicting an upper portion of a refractory and vertical compression members of an exemplary metallurgical furnace of the present invention, and partly depicting an exemplary roof and an exemplary cooling system, both for metallurgical furnaces, of the present invention.
Figure 3A:
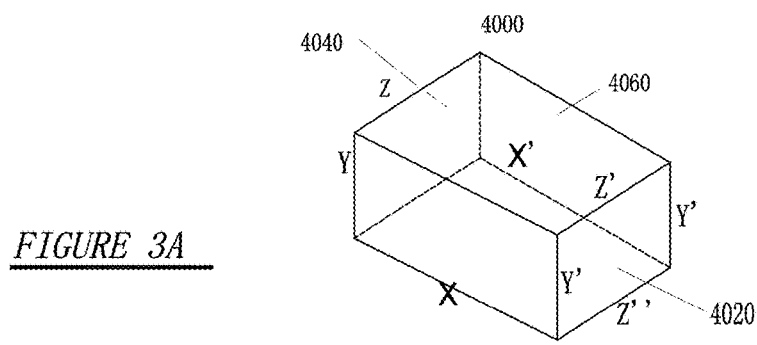
FIG. 3A is a detailed view of a single exemplary brick of an exemplary refractory for a metallurgical furnace of the present invention.

FIG. 3A shows an exemplary brick 4000 of the exemplary refractory 20 in accordance with one exemplary embodiment. In order to compensate for differences in vertical expansion within a single radial layer of brick, in some embodiments, the brick 4000 may be configured appropriately, as exemplified on FIG. 3A. On FIG. 3A, three axes (x, y, z) are represented. For the purpose of the example, a heat source is expected on the surface 4020 or plane y'-z'. Heat would thus be higher, in use, on the concave face (interior) 4020 of the brick 4000 than on the convex face or plane y-z. The height of the brick 4000 along the y axis on the interior face 4020 (y') could be less than at the exterior face (y) in order to compensate for varying expansion between the two faces. For the example of FIG. 3A, the lateral profile 4080 of the brick 4000 is a isosceles trapezoid, with the x being equal to x'. Skilled person will understand that the profile could also be a rectangular trapezoid or another type of trapezoid (where x and x' would be different) as long as the desired difference between y and y' is established. In the present example, because the difference for each brick is so small a reasonable correction may only be required for 4-5 bricks combined. Similarly, the length of the brick 4000 on the interior face 4020 (y'-z') could be smaller than the expected arc length at the exterior face (y-z). To a lesser extent, the length on the interior face 4020 at the bottom of the brick 400 (z") could be less than at the top of the same face (z') if a vertical temperature gradient exists.

A skilled person will readily understand that the configuration of the brick 4000 will have to take into account the stackability thereof. It may prove difficult to have adjusted dimensions on the height and length while making sure that the layers 22, 24 and/or 26 can be assembled from the brick 4000. In certain embodiments, only one of the dimension may be selected for adjustment. Another solution is to maintain a flat back portion of the brick 4040, which ensures stable stackablity, while a front portion 4060 is shaped considering varying expansion based on heat dissipation, as exemplified above. Yet another solution is to have a distribution of the configured bricks in the layer 22, 24 and/or 26 so as to provide stability. For instance, the varying configuration could be applied throughout a layer of bricks, but could also vary depending on the position of the brick 4000 in the stack. The varying configuration could also be applied to only some of the stacked bricks and not to others, e.g., on bricks surrounded by normal bricks, on diagonal series of bricks, etc.

For example, for an inner layer of brick having a cool vertical height of 4" or 101.6 mm per brick 4000, experiencing temperatures of 800 degrees Celsius on the inner face 4020, and 400 degrees Celsius on the outer face, with the inner layer having a height of 11 m, a correction may be made to the shape of the bricks, of approximately 3 mm (i.e. the brick is 3 mm taller at its outer face than inner face), for every fourth vertical layer of bricks, except for the top eight layers of bricks. Skilled persons will readily appreciate the appropriate degree of correction to be made to compensate for uneven vertical thermal expansion experienced by a single radial layer of brick.

The inner 22 and second 24 layers of bricks may be laid in the same fashion as the outer 26 layer. In these embodiments, the three layers 22, 24, 26 of bricks are thus independent of one another vertically.

In preferred embodiments, the bricks of each layer of the refractory 20 are configured to form a series of circular layers, stacked on top of one another, by having two side ends cut at an appropriate angle and a front and back end cut an appropriate shape, such that when a sufficient number of the bricks is positioned adjacent to one another, side end to side end, a circle is formed, which circle is thus resistant to any horizontal compressive force.

In the furnaces 10 depicted in FIGS. 1 and 2, the refractory 20 is housed in the shell 40, which may be cylindrical in shape, and may be made of steel. Skilled persons will recognize that other metals or materials may also be suitable for the shell 40 material. In the depicted example, the shell 40 is divided into several sections 42 divided by vertical cuts 44 or gaps 53 between adjacent sections 42. In the embodiment depicted in FIG. 1, the shell 40 is divided into eight sections 42. In general, increasing the number of shell sections 42 will increase the uniformity of distribution of stress imparted on the refractory 20 during expansion and contraction, and larger numbers of shell segments 42 may be appropriate in cases where the overall furnace size is relatively larger, where as smaller numbers may be appropriate for relatively smaller furnaces. In preferred embodiments, in each section a plate of ring steel or the same material as the shell is welded at the bottom ends of the shell plate, functioning as a flange 46. Holes may be made to allow bolting the shell plate on the bottom flange in the hearth 47 depicted in FIG. 4A. A clearance of 60-70 mm gap between each shell section 42 may be required for the present example. In the example depicted in FIG. 1A on each side of shell plate 42 a strip is welded on as a flange 43. Holes on the flange are made to allow long screws 41 bolted onto the same flange of adjacent plate. The screws are positioned so that the clearance of 60-70 mm gap can exist. A number of screws 41 may be adjusted accordingly to withstand the ferrostatic pressure from within the furnace 10 during operation to lock a maximum expanded position of the shell 42. In order to avoid furnace gas leaking through this gap, thin strips 54, which may comprise steel or any other suitable material, may be placed behind the outer brick layer 26 against the shell sections 42 to cover the gap. The width of the strips 54, may be slightly larger than the gap to form a seal between the two adjacent shell sections 42. In other embodiments, flanges 43 may comprise an expandable material configured to provide a seal between two adjacent shell sections. Skilled persons will readily appreciate that other suitable sealing means may be used to provide a gas seal between adjacent shell sections 42, thereby preventing gas escape or ingress during expansion and contraction of the refractory 20 and corresponding movement of adjacent shell sections 42 away from one another. In preferred embodiments, after all the sections of shell plate are fixed and installed, bricks 26, 24, and 22 may be laid against the shell plate. When the furnace 10 is ready to start up, the bolts at the bottom flange 46 may be removed and the shell plates may then move freely as they expand or contract. Displaced horizontally about the shell sections 42 are one or more force exerting members comprising binding members 50 and tension members 60. Compression members (not shown) may possibly be used, but they would likely fail to provide a range of self-adjustment that is large enough for many situations.

In preferred embodiments, the binding members 50 may be steel cables, which may be braided steel cables comprising numerous steel filaments or wires, although skilled persons will readily appreciate that many other forms of binding members 50 may be suitable. The binding members 50 are under a tension, such that a compressive force is applied to the shell sections 42, which transfers this compressive force to the refractory 20. Each of the shell segments 42 may be made of individual plates welded together. Welds may be subject to fatigue, especially if constantly under a bending moment. Having the outer shell 40 segmented together with the force exerting members, when used properly, may diminish the bending moment that welds may sustain.

To reduce the likelihood that the binding force at normal operating condition will exceed the maximum tension capacity, the retaining members 41, which may be screws, may fix the position of the shell plates 42. When the shell sections 42 expand to a locking position, they will be impaired from further expansion, and the ferrostatic pressure from within may be withheld by the locked shell sections 42, rather than by the tension members or binding members.

In preferred embodiments, the binding members 50 are maintained under tension by the use of tension members 60 loaded onto the binding members 50. In certain preferred embodiments, the tension members 60 are heavy duty springs.

In some embodiments, the force exerting member comprises a plurality of pressing members disposed around an outer surface of the segmented outer shell 40, each pressing member for pressing against the outer surface and thereby exerting a compressive force thereon. These pressing members may be springs, configured to press directly on the outer surface of the steel shell segments, or may be shoes, configured to press against the outer surface, and may be biased against the steel surface, for example by springs (not shown). In some embodiments, the pressing members may be adjustable to apply greater or lesser compressive force on the segmented outer shell 40. In some embodiments, the pressing members may be supported by a support structure, which may be external to the metallurgical furnace 10, for example steel buckstay columns 70 surrounding the metallurgical furnace 10 and connected to one another laterally. Skilled persons will readily appreciate the appropriate number, form, and configuration of support structures for supporting the pressing members considering, e.g., dimensions of the furnace 10 and expected forces.

In the embodiments depicted in FIGS. 1 and 2, the binding members 50 are supported by a plurality of vertical columns 70. In the depicted embodiments, the vertical columns 70 are four buckstay columns, distributed radially and evenly, at 90 degree angles from one another, around the shell 40. Skilled persons will readily understand that more or less support columns 70 could be used without affecting the teachings of the present invention. In applications where the capacity of the tension members 60 available is not large enough, more binding members 50 and tension members 60 may be required, and the number of columns 70 and tension members 60 may vary in order to accommodate the need of total binding force, particularly for the metal area at the lower part of the furnace 10. With reference to FIG. 4, in preferred embodiments of the present invention, four pairs of steel cables functioning as binding members 50 are positioned along the height of the furnace 10, with each pair positioned such that each member of a pair of tension members 60 corresponding with a pair of binding members 50 are positioned radially opposite one another. The use of multiple pairs of cables, while optional, aims at reducing the possibility of failure of the binding system. Similarly, it is unlikely that both cables in a pair would fail simultaneously. Additionally, the use of multiple cables, once the binding system is dimensioned appropriately, provides the exemplary advantage of facilitating maintenance of the binding system, as one member fails, others may be of sufficient strength to function independently. Thus, if a tension member 60 or a binding member 50 requires replacement or repair, that tension member 60 or binding member 50 may be removed without removal of the other member of the pair, and therefore without having an impact on the function of the horizontal binding system overall. Furthermore, with the aforementioned locking system, the maintenance of the binding members 50 and tension members 60 may be further facilitated.

With reference to FIGS. 1 and 2, in preferred embodiments, the binding members are exemplified as steel cables 50 supported and maintained in place by positioning members 52 which may be wheel members mounted onto the buckstay vertical columns 70. These positioning members 52 allow for expected movement of the steel cables 50 relative to the shell sections 42, and vice versa.

In certain preferred embodiments, a mechanism or means to measure the tension 55 goes along with the tension members 60. That may facilitate monitoring and maintaining a target tension in the binding members 50. These means are, in preferred embodiments, a scale to measure the elongation of the springs as the tension equals to the elongation multiplied by the spring constant of the tension members 60. Tension may be adjusted through use of a length adjustment device 90, which is exemplified as a turnbuckle, for adjusting the length, and therefore the tension, of the binding members 50. As a result of the binding members 50 being under tension, a compressive force will be applied to the shell 40, and thus on the refractory 20. Higher tension will result in a greater compressive force being placed on the refractory 20. In preferred embodiments, the compressive force, and therefore the tension, suitable to maintain radial stability of the refractory 20 around the freeboard space will be relatively lower when compared to that suitable to maintain stability of the refractory 20 around the lower portion of the furnace 10 containing molten materials or materials to be heated. As the ferrostatic pressure increases at lower part of the furnace containing molten metal, if the binding force does not increase in accordance with the pressure, the lower part of the shell sections 42 may bulge and cause tilting of the whole section. A level device may thus be placed on the bottom flange to determine whether it is at or near level. Tension may be increased at lower part by shortening the length of binding member 50 to tighten the shell sections 42 to keep the flange in a generally horizontal position.

During use, the refractory 20 is heated, and may have a thermal gradient ranging from approximately 1000 degrees Celsius at its inner surface decreasing to approximately 80 degrees Celsius at its outer surface. When heated, the refractory 20 may expand in all directions. In preferred embodiments, the inner 22 and second 24 layers of periclase bricks will absorb and diffuse heat, and will expand to an expanded size which will vary depending on the temperature to which the individual brick is heated. For example, bricks closer to or in direct contact with molten metal or slag, or in direct contact with heated furnace gas inside the furnace space, will be hotter, and therefore more expanded, than bricks which are not in direct contact with molten metal or slag, or heated furnace gas. It should be noted that in use, some of the bricks of the lower portion of the inner layer 22 will likely be coated in a "frozen" or solid "skull" of slag or metal, which may have a melting point ranging from 1000 to 1600 degrees Celsius. By maintaining the brick refractory 20 at a target temperature range, this skull will remain solid and may act as a lining to the furnace 10, which may provide additional stability to the furnace 10, and which may function to limit escape of molten metal or slag into the brickwork of the refractory 20. As an example of a typical ilmenite smelting furnace, the slag contains over 80% TiO2 with a liquidus temperature of 1640 C, the molten slag freezes as it contacts the refractory 20 at 800 to 1000 C. The frozen slag as "skull" prevents further attack of molten slag on the refractory 20. By experience, it was not possible to identify a known oxide material that could resist the corrosion of molten high TiO2 slag, except for refractory metals such as molybdenum, tantalum, and, platinum. A key aspect of smelting ilmenite ore is to control this frozen slag skull and maintain it at around 300 mm thick as a safe target.

In preferred embodiments of the present invention, the refractory 20 is initially assembled with expansion papers (not shown), which may have a thickness of approximately 0.4 mm, placed between radial layers of bricks. The thickness of the papers used is calculated so as to compensate for the expected expansion of the bricks, and the overall diameter of the furnace 10, including the papers, is therefore intended to approximate the expected expanded configuration of the furnace 10. Once heated during use, the expansion papers will burn, leaving space for the refractory 20 bricks to expand and fill the spaces. In preferred embodiments, where an outer layer of bricks 26 comprises graphite, graphite felt may be used in place of expansion papers at the outer layer.

During the first use, as the refractory 20, brick members expand laterally (which form of expansion may also be referred to as "horizontally" or "radially" herein), the overall diameter of the refractory 20 should remain that of a generally constant expanded, or heated, configuration, in view of the burning of the expansion papers as discussed above. However, when the furnace 10 is cooled, the refractory 20 will cool and contract, and the refractory 20 will contract to a contracted configuration, having a reduced diameter.

In preferred embodiments, the steel shell 40 will have a first diameter that corresponds with a contracted configuration of the refractory 20. The steel shell 40 may be manufactured as a generally cylindrical shell, having the first diameter, and then cut with a series of vertical cuts 44 to form a set of at least three, or at least eight, shell sections 42.

When the refractory 20 is assembled, including expansion papers, as noted above, the refractory 20 may have a diameter corresponding with an expanded configuration. As discussed above, the steel shell 40, may comprise a set of curved shell sections 42, which collectively form a cylinder having a diameter corresponding with a contracted configuration of the refractory 20. Accordingly, when the steel shell sections 42 are assembled around the assembled refractory 20, there may be gaps or spaces formed between adjacent shell sections 42.

When the furnace 10 is cooled, for example during a period of maintenance or non-use, the bricks forming the refractory 20 will cool and contract. At the same time, the compressive force applied to the steel shell 40 will force the shell sections 42 generally toward a vertical axis at the centre of the furnace 10, and the gaps or spaces between adjacent segments 42 will lessen or disappear when the entire furnace is cooled to room temperature. In preferred embodiments, the compressive force will similarly force the contracting bricks inward toward the centre of the furnace 10, thereby reducing formations of gaps or spaces between the bricks. The tension of the binding members 50 will reduce or relax as the refractory 20 enters a contracted configuration, the length adjustment device 90, which may be a turnbuckle, may be used to reduce the length of binding members 50 while maintaining the same binding force when beyond the automatic adjustment range, thereby permitting the refractory 20 bricks, when eventually reheated, to expand against one another with the adjustment of the length of the binding members 50 when the expansion is beyond the automatic adjustment range.

When the furnace 10 is heated again, the refractory 20 will heat up and expand to an expanded configuration, having a relatively increased diameter. As the refractory 20 expands, spaces or gaps will occur between adjacent segments 42 of the shell 40, and the binding members 50 (e.g., steel cable) will move as the tension member 60 (e.g., springs) stretch and expand to compensate for the expansion of the shell 40. During this expansion, movement of the cables relative to the shell segments 42 may cause rolling of the positioning members 52, which may turn to allow the movement while reducing friction and wear on the binding members 50 which may be lengthened through turnbuckle 90.

In preferred embodiments, the refractory 20 and the shell 40 compresses brick layers 48 and 49 of the hearth refractory 45. In these embodiments, expansion papers may be placed between layers 48 and 49 during furnace installation, in order to provide space between the layers 48 and 49 prior to furnace use.

The process of furnace heating and cooling, and resulting expansion and contraction of the refractory 20, may be repeated through multiple cycles, with the binding members 50 maintained under tension and applying a compressive force, thereby reducing formation of gaps between bricks between cycles and increasing the stability of the bricks in the refractory 20 during the heating and cooling cycles. Furthermore, a space between bricks may be provided, for example with expansion papers, to reduce thermal stress generated during the initial furnace expansion at startup.

With particular reference to the example of FIGS. 2 and 3, preferred metallurgical furnaces 10 in accordance with some exemplary embodiments of the present invention comprise a mechanism for compensation of vertical expansion and contraction of the refractory 20, for example during heating and cooling.

As shown in FIG. 3, in preferred embodiments, covering members 104, each having a different diameter corresponding with the diameter of one of the layers 22, 24, 26 of refractory brick, are disposed above the refractory 20. Furnaces built in accordance with the present invention may be square, rectangular, hexagonal, octagonal or otherwise present some straight segments in horizontal cross section. In these examples, the covering members 104 would be shaped appropriately (square, rectangular, or otherwise), whereas in furnaces that are round in horizontal cross section, the covering members 104 may be round in shape. In preferred embodiments, each of the covering members 104 has outer and inner diameters approximately the same as an outer diameter of the corresponding brick layer, although other embodiments, for example where the outer diameter of the covering member 104 is less than that of the corresponding brick layer, and/or the inner diameter is also less than that of the corresponding brick layer, may be used. In preferred embodiments, the covering member 104 comprises a single contiguous piece having a circumference, but skilled persons will readily appreciate that covering members 104 may also comprise a plurality of separate segments or broken rings. Between covering members 104 and the refractory 20, a thin layer of elastic material such as Teflon™ (not shown) may be placed as a seal, which may prevent any leak of gas through the refractory. Similar material may also be placed between refractory 22 and 24, and refractory 24 and 26, at the top bricks to improve sealing.

In preferred embodiments, a plurality of pressure members 100 is disposed around the circumference of each covering member 104. In further embodiments, no covering members 104 are required, and the pressure members 100 are directly in contact with an upper surface of a refractory layer. In other embodiments, the covering member 104 may comprise a plurality of segments, or individual plates may be placed over individual bricks or sequences of bricks. In still further embodiments, a single covering member or other member may be disposed over more than one radial layer of bricks.

The pressure members 100 are adapted to exert downward pressure or force upon the refractory 20. In use, when the refractory 20 is heated, the resulting thermal expansion of the bricks will result in expansion of the refractory 20 to an expanded configuration. As discussed above, this expansion will be in all directions, including vertical. Thus, the overall height of each of the layers 22, 24, 26 of brick in the refractory 20 will vary as the bricks are heated and cooled with thermal cycling of the furnace 10. Also as discussed above, the inner layer 22 will be exposed to higher temperatures, and therefore greater thermal expansion, than will the second 24 layer, and so on. Accordingly, the height of the inner 22 layer in an expanded configuration, unless preconfigured otherwise, is expected to be somewhat greater than that of the second 24 layer or outer 26 layer.

In preferred embodiments, the pressure members 100 are steel springs, housed in a cap 102 disposed upon a surface of each covering member 104. In further preferred embodiments, the pressure members 100 are radially and evenly distributed around the circumference of each covering member 104.

In the embodiment depicted in FIG. 3, the pressure members 100 are mounted to a pressure adjusting member 110, which is in turn mounted to a suspension member 120 which may be rigid. In preferred embodiments, the pressure adjusting member 110 may be a length adjustment device, and the rigid suspension member 120 may be a steel rod. In further preferred embodiments, the pressure adjusting member 110 and the rigid suspension member 120 may be manufactured from a single steel rod which is cut and connected by a threaded connection to allow for adjustment of the combined length of the rigid suspension member 120 and the pressure adjusting member 110. By adjusting the combined length the rigid suspension member 120 and the pressure adjusting member 110, the downward force exerted upon the refractory 20 is also adjusted, and may therefore be maintained at a target level.

In use, as the refractory 20 is heated and cooled, and expands and contracts vertically, the pressure members 100 contract and expand in compensation, always forcing the refractory 20 downward, which aims at increasing vertical stability of the refractory 20. In this way, it is expected that formation of spaces and unevenness of the vertical layers may be minimized. In particular, in one example, where each vertical layer of refractory bricks is independent from one another, without any cement or other binding material between vertical layers, the increased vertical stability provided by this system may improve the overall stability of the structure and may increase the lifespan of the furnace 10.

In the embodiment depicted in FIG. 3, the rigid suspension members 120 are movably mounted to a horizontal supporting member or beam 130 by horizontal sliding members or rolling members 140. During use, as the refractory 20 expands or contracts radially or horizontally, the rigid suspension members 120 may also move a corresponding distance. In doing so, the direction of the force exerted by the pressure member 100 may be aligned with the center of gravity of each layer of the refractory 20. This may limit or eliminate the possibility of sliding of refractory which may otherwise result in a collapse. In preferred embodiments, the ring members 104, if included, will be divided into a number of segments to allow the overall expansion and contraction of the refractory 20.

In certain embodiments of the present invention, existing radially symmetric or "circular" metallurgical furnaces may be adapted or "retrofitted". In preferred methods, the outer cylindrical steel shell of an existing furnace is cut into a number of, for example, three, eight, or more than eight, shell segments.

In preferred methods, one or more binding members are disposed horizontally about the cut steel shell. These binding members are placed under tension, which may be maintained by loading tension members, which may be heavy duty springs, onto the binding members. In preferred embodiments, the binding members are steel cables, and are arranged in one or more pairs distributed along the height of the cut shell. The binding members under tension exert a compressive, or inward, force on a refractory within the cut shell of the retrofitted furnace.

When heated and cooled, the refractory of the retrofitted furnace will expand and contract, and the steel shell segments will move inwardly and outwardly in response to expansion and contraction of the refractory, held in place by the binding members, as the tension members expand and contract. The tension may be maintained, adjusted and/or monitored by loading length adjustment members and tension measuring members onto the binding members.

Preferred methods of retrofitting or adapting existing furnaces also include a step of replacing the refractory. Once replaced, the refractory may comprise an inner layer of bricks, which may each be radially symmetric in horizontal cross section, with an inner and second layer comprising thermally dispersive material such as periclase, and the outer layer, next to the shell comprising a material which may have a high thermal conductivity, for example graphite. In preferred embodiments, the layers of bricks will be staggered vertically, and vertical layers will be independent from one another.

In preferred methods, a flange may be attached, for example welded, on the end(s) of (a) curved shell segment(s) before furnace start-up. Shell sections may be bolted on the flange to fix with a hearth flange positioned at the bottom. Once the bricks are assembled, the bolts are removed from the retrofitted furnace to allow for movement of the segments relative to the refractory.

In preferred embodiments, expansion papers may be placed between the radial layers of bricks to approximate a refractory diameter corresponding with an expanded configuration. Once heated during furnace use, these papers will burn, and the expanding bricks will fill the resulting spaces.

In still further preferred embodiments, methods of retrofitting or adapting existing radially symmetric furnaces, or furnaces that are square or rectangular in horizontal cross-section, include steps to install a vertical binding system for increasing vertical stability of the refractory. Installing the vertical binding system may include disposing one or more pressure members above the refractory for exerting downward pressure on the refractory. Preferred methods may include disposing the pressure members on covering members or other members above a radial layer of refractory brick. Where covering members are used, one covering member for each of the two, three, or more radial layers of brick may be used. The pressure members may be mounted or welded on a surface of the covering members or other members, and may be housed in a cap. Rigid suspension members, which may be steel rods, may be mounted to the pressure members, which may be springs. In preferred embodiments, the rigid suspension members will then be movably or slidably connected to horizontal support members, which may be steel beams. By the movable connection, the rigid suspension members are permitted to move back and forth horizontally in compensation for radial expansion and contraction of the refractory from an expanded position (heated) to a contracted position (cooled).

Figure 5:
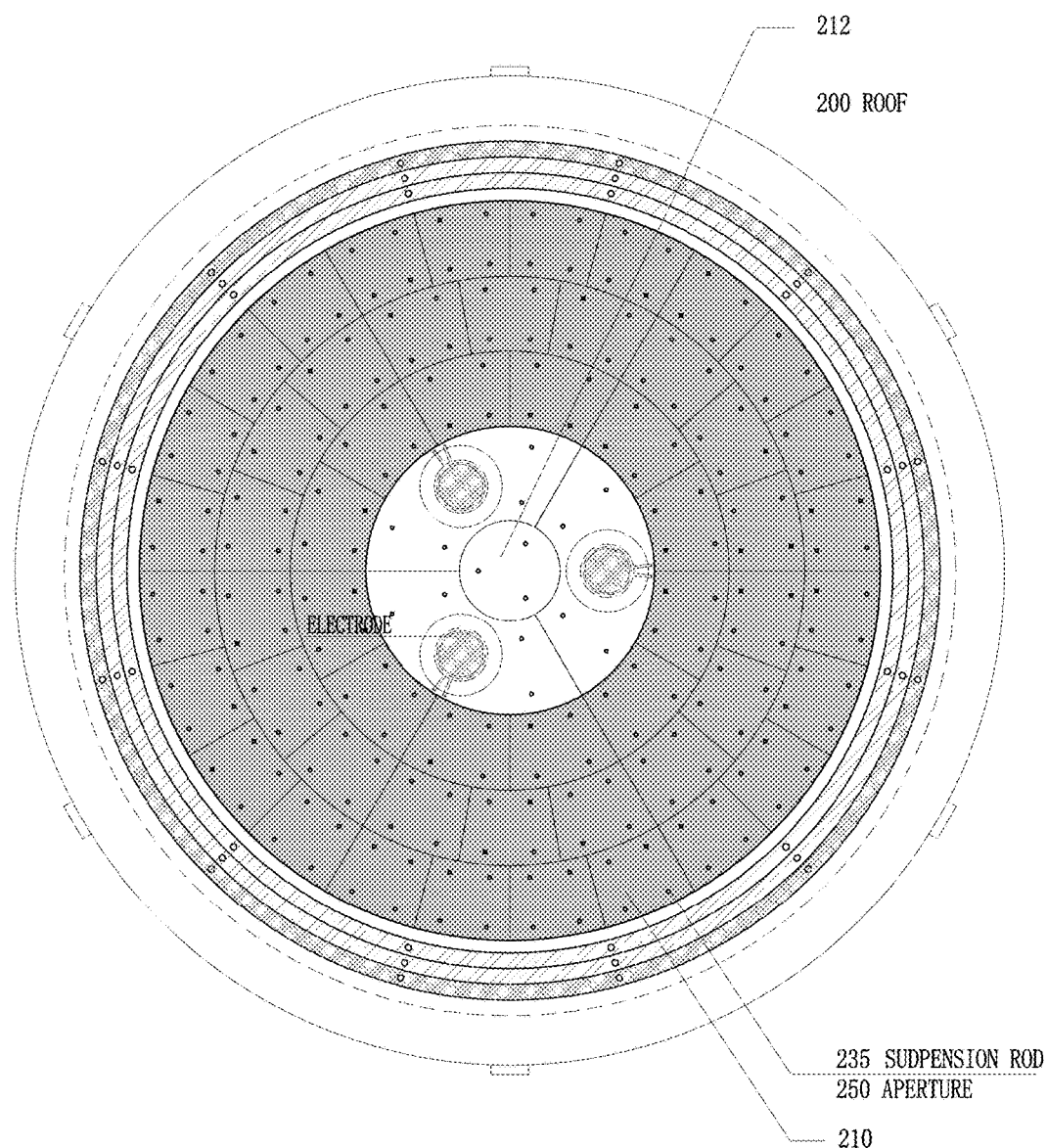
FIG. 5 is a plan view depicting the top of an exemplary roof for a metallurgical furnace of the present invention.

With reference to FIG. 5, preferred embodiments of the present invention comprise a roof 200. In use, the lower surface of the roof 200, facing toward the inner furnace space 30, as shown in FIG. 1, may be coated with a layer of dusts and other materials generated in the furnace 10. This layer may have a thickness of 10 to 20 cm, depending on factors including radiative heat flux from the slag and from any electrical arcs generated inside the furnace 10. The temperature inside the molten material may range from 1500 to 2200 degrees Celsius, and the temperature on the inner face of the roof 200 may range from approximately 1200 degrees Celsius to 1600 degrees Celsius. Accordingly, a roof 200 having a low degree of thermal and electrical conductivity is suitable for use in connection with the furnaces 10 of the present invention. A roof 200 that would be adapted to maintain an outer surface temperature of 20 to 40 degrees Celsius is especially suitable. A relatively thick and massive roof 200 comprising materials having low conductivity may be suitable for providing a reduced outside surface temperature.

As depicted, the roof 200 in accordance with an exemplary embodiment of the present invention may be formed of a plurality of blocks 210, adapted to fit together to form the shape of the roof 200. In the embodiment depicted in FIG. 5, all but the centremost block 212 are arc-shaped, with adjacent blocks 210 forming a series of rings, whereas the centre block 212 is circular in shape. Skilled persons will appreciate that many other possible configurations may also be provided without departing from the teachings of the present invention.

Figure 6:
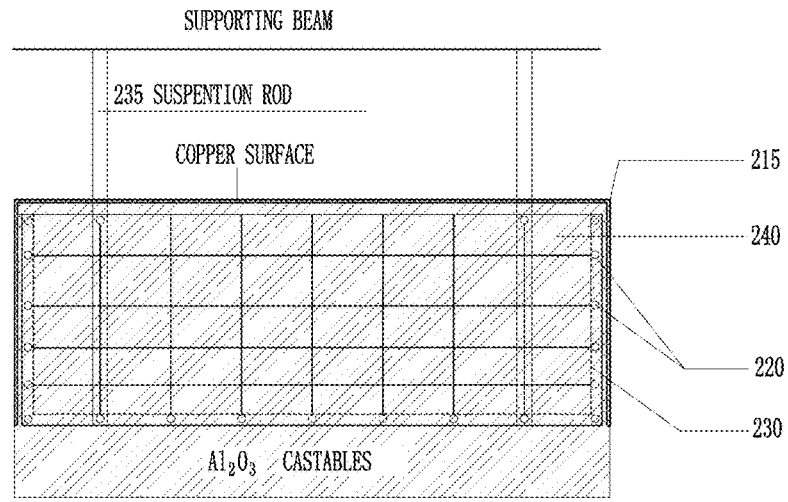
FIG. 6 is a cross-sectional view depicting a portion of an exemplary roof for a metallurgical furnace of the present invention.
Figure 6A:
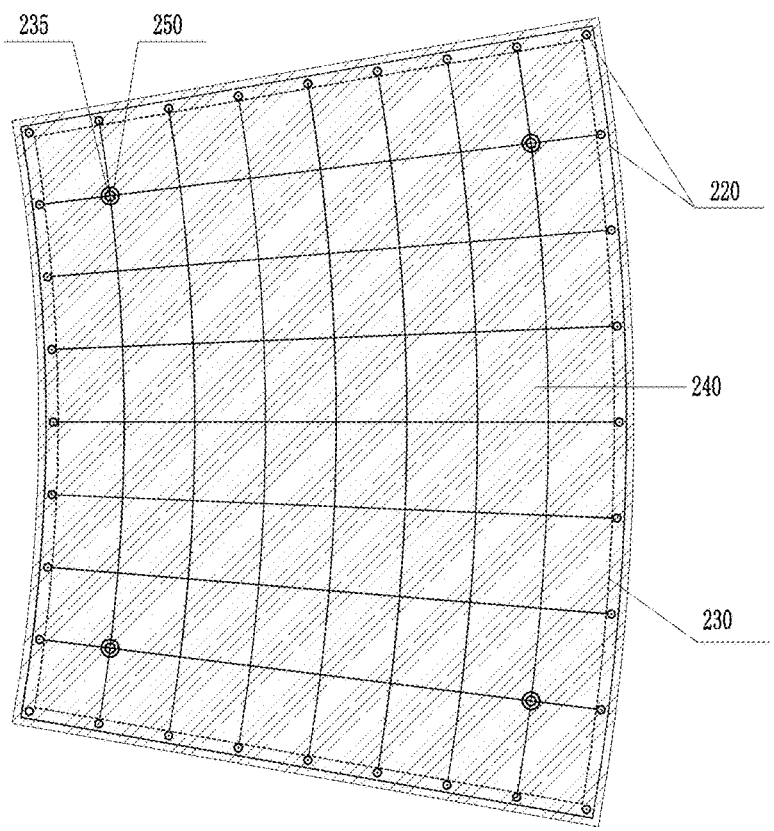
FIG. 6A is a plan view depicting the bottom of a section of an exemplary roof for a metallurgical furnace of the present invention.

As shown in FIGS. 6 and 6A, each block 210 may be made from an open cap 215, formed of a non-magnetic metal, for example, copper to prevent induced current from being generated. The caps, which may be made of copper, may be sealed between one another by using elastic materials (e.g., rubber and teflon) between members to form an upper copper surface of the roof. Skilled persons will appreciate that copper has a high thermal conductivity suitable for the intended use, but that other materials may also be used in accordance with the teachings of the present invention. In the embodiment depicted, a framework 220, which may be formed of rebar, for example steel rebar, supports the cap 215 and a mesh network 230, which may be a steel mesh network. In especially preferred embodiments, this steel mesh network 230 may comprise high temperature resistant steel.

In preferred embodiments, the cap 215 is filled with non-conductive castable material 240, having a low degree of thermal conductivity, for example, high alumina ($Al_2O_3$) castables. In general, thicker layers of the non-conductive and mechanically strong material will provide increased electrical as well as thermal insulation. Castable materials that are non-reactive and non-soluble in water, for example high alumina castables, tend to deteriorate more slowly during use, have a longer lifespan, and are particularly well-suited to use in the roof 200 for the furnace 10 of the present invention. The roof 200 having a relatively increased thickness of the castable layer 240 is generally preferred. In especially preferred embodiments, as depicted in FIG. 6, the castables 240 may exceed the depth of the cap 215 by 10 cm, 15 cm, or greater, to have an overall depth of 50 cm, 60 cm, or greater. In the preferred embodiments depicted, the combination of the framework 220 and the network 230 provides support for the increased mass of the layer of castable material 240. In use, a layer of dusts and particular matter, which may be referred to as a "skull" may accumulate on the underside of the roof 200, providing additional thermal insulation.

In the embodiment depicted in FIG. 5, individual roof blocks 210 are supported vertically by a plurality of supporting members 235 which are welded on the framework 220 and extend through appropriately sized apertures 250 formed in the cap 215. In the embodiment depicted, each block 210 may be supported by four supporting members 235, each extending through an appropriate aperture 250.

In preferred embodiments, any spaces between adjacent blocks 210 are sealed with an appropriate tar, cement, or functionally similar substance. Similarly, in further preferred embodiments, such spaces between the supporting members 235 and the cap 215, formed within the apertures 250, are sealed in a similar fashion.

In preferred embodiments, the roof 200 is adapted to support and hold a layer of cooling liquid, for example water. In these preferred embodiments, the shape of the upper surface of the roof 200 is adapted such that at least some of the liquid poured or dispersed onto the roof 200 will move outwardly, toward the outer edge of the roof 200. In these preferred embodiments, as depicted in FIG. 3, a trough 260 may be formed around the outer radial edge of the roof 200, or at any point around the roof 200. An outer wall 275 of the trough 260 may have a higher height than an inner wall 270 of the trough 260, such that a layer of liquid coolant may be retained on the roof 200 with a target thickness, for absorbing heat from the furnace 10. In preferred embodiments, trough 260 of the present invention may comprise a weir extended inner wall 270, and/or a sensor, to monitor and/or control cooling liquid depth. In further preferred embodiments, the cooling liquid may be displaced away from the trough 260 with a liquid displacement member, for example a sump pump, and may be continuously replaced by ambient or chilled cooling liquid. This displacement may be on a continuous basis, such that a layer of the cooling liquid is continuously refreshed and cooled, while maintaining a target depth or target depth range, which may be varied in response to internal furnace pressure which is typically between 5 mm and 10 mm of water gauge during use. In preferred embodiments, this depth of liquid coolant may be between 20 mm and 50 mm.

In especially preferred embodiments, the layer of liquid coolant, which may be water, retained on the roof 200 may function to provide a seal to reduce the escape of gases, for example carbon monoxide, from the inside space of the furnace 10. During use, metallurgical furnaces may generate a variety of toxic materials, including gases. By retaining a layer of a target thickness of liquid coolant such as water on top of the roof 200, furnaces 10 may reduce the amounts of gases and dusts that pass from the furnace 10 and into the surrounding environment, which may improve worker safety conditions and reduce environmental impact of the furnace 10 operation.

Although not shown in FIG. 5, openings in the roof 200 for feed pipes, for example in the centremost block 212, may be provided as well as elsewhere as necessary. These feed pipes may be surrounded by a small non-magnetic member, for example a copper cylinder, which may be welded to the plate 215, to cool the pipe and to prevent any cooling liquid from flowing downward along the pipe. A seal may be provided between the pipe and the copper cylinder.

In certain preferred embodiments, gas retention inside the furnace 10 is further aided through placing a seal (not shown), which may be an annular seal and which may have a degree of flexibility and elasticity, between the outer wall 275 of the trough 260 and the brick refractory 20 to create a seal. In cases where the seal between adjacent blocks 210 is compromised and small amounts of liquid coolant leak through, if water is selected as liquid coolant and alumina castable material is selected for the blocks 210, it provides the exemplary advantage of being non-reactive with, and non-soluble therein. Additionally, in view of the relatively increased temperatures that such leaked liquid would be exposed to, such liquid coolant would likely vaporize. In cases where the integrity of the roof 200 may be compromised, steam or other visible indication of vaporizing cooling liquid may act as a signal to stop furnace operation and to replace any faulty aspects of the roof 200, for example faulty blocks 210.

In certain embodiments, a roof 200 of the present invention may comprise a covering layer to enclose and prevent evaporation of liquid coolant to the ambient environment.

A roof 200 of the present invention may be suitable for use or installation in conjunction with metallurgical furnaces 10 that are radially symmetric in horizontal cross-section, or furnaces that are square or rectangular in horizontal cross-section.

With reference to FIGS. 3 and 4, the exemplary furnace 10 may be cooled by use of air displacement means 500, which may be fans for displacing air away from an envelope of air 505 surrounding the furnace 10. In the embodiment depicted, an outer sleeve or cover 520, which may be made of steel, surrounds the furnace 10, and contains the envelope of air 505. The sleeve 520 may be divided into a number of sections, which may correspond with the number of shell sections 42, thereby surrounding, collectively with the corresponding shell section, a volume of air to be displaced. These sleeve sections may be welded to a flange 43 of the corresponding shell sections 42. Each section may be provided with one air displacement means 500. In these embodiments, the sleeve 520 will move along with shell sections 42 during expansion and contraction of the furnace 10 corresponding with heating and cooling cycles. In use, the envelope of air 505, which may comprise a number of individual segments, each contained between one segment of shell 42 and one segment of sleeve 520, will be heated by the outer surface of the shell 40 of the furnace 10. The air displacement means 500, depicted as being mounted in an air duct manifold connected to a flexible section at the upper portion of the sleeve 520, will then displace the heated air away from the envelope of air 505. In the embodiment depicted, this displacement will be by way of suction created by one or more fans.

As air is displaced out of the envelope 505, negative pressure may be created within the sleeve 520. In preferred embodiments, the pressure differential between the envelope 505 and the outside environment is sufficient to draw an adequate amount of ambient air to contribute to the cooling of the steel shell 40, while providing the additional advantage of drawing away any hazardous gases which may have leaked from the inner furnace space 30 through the frozen skull lining and/or though the refractory layers 22, 24, 26 in an unlikely event. As exemplified on FIG. 4, one or more air ingress apertures 510, which may be slots, formed in the sleeve 520 may permit an ingress of ambient or cooled air to enter the envelope 505, thereby replacing the heated displaced air and cooling the furnace 10. By use of the sleeve 520 in accordance with some embodiments of the present invention, as compared with using only air displacement means or fans, the speed at which the displaced air may be increased. In certain embodiments, the air drawn away from the envelope 505 may be filtered or otherwise processed in order to remove or neutralize contaminants, if needed.

In further preferred embodiments, the system for cooling the furnace 10 may comprise one or more spray nozzles 545, which may be any suitable spraying means, for spraying cooling liquid onto the outer surface 40 of the furnace 10 during use. In especially preferred embodiments, the cooling liquid is atomized into a mist by the one or more spray nozzles 545 to be directed onto the outer surface 40 of the furnace 10, which nozzles 545 may be directed accordingly in the event that hot spots in the refractory 20 are detected through embedded thermocouples. The cooling liquid, which may be water, is then warmed by the outer surface 40 of the furnace 10 and subsequently evaporates, contributing to cooling the shell 40. When used in combination with the air displacement means 500 discussed above, the use of which may result in air movement along the outer surface 520 of the furnace 10, the sprayed cooling liquid may evaporate at an enhanced rate, leading to enhanced cooling of the shell 40. Rapid evaporation of the cooling liquid may also have the effect of reducing accumulation of cooling liquid, for example at a lower surface of the furnace 10, and may therefore reduce associated safety hazards, for example explosion in the unlikely event of a furnace runout resulting from molten metal or other materials escaping from the furnace 10 and contacting any surplus liquid.

In preferred embodiments, a detector (not shown) may be employed for regulating spraying of cooling liquid. In use, when levels of cooling liquid are detected as having accumulated at a lower surface of envelope 505, the detector would reduce the spraying of cooling liquid and/or, in the meantime, increase the air flowrate if the hot spots are still detected. Once the cooling liquid has dispersed, evaporated, or otherwise been removed, such that a target level, for example none, of cooling liquid is present at the lower surface, the spraying of cooling liquid would be increased to combat any overheat. If no hot spots are detected, the spraying liquid may not be used.

Figure 7:
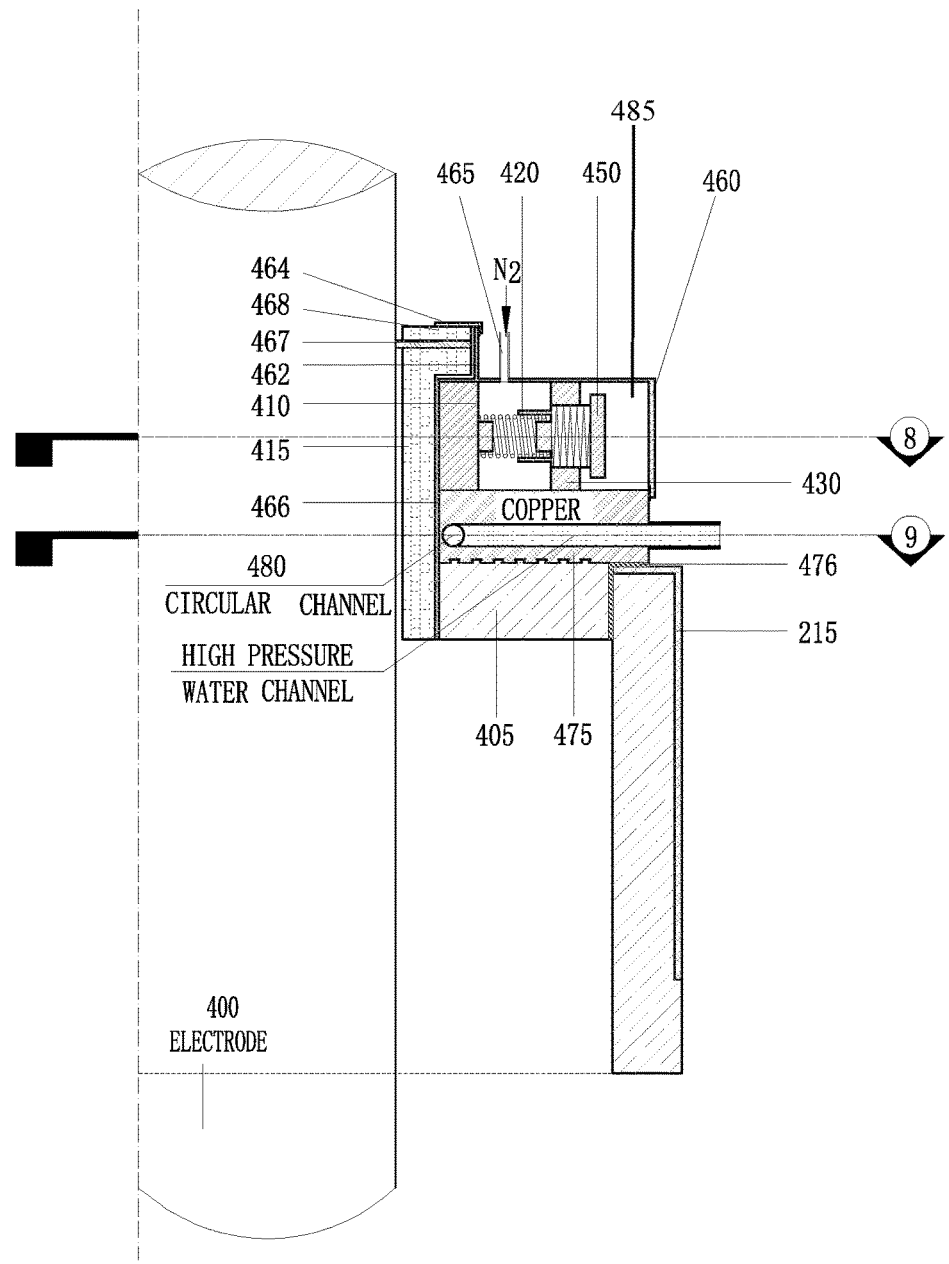
FIG. 7 is a vertical cross-sectional view depicting an exemplary electrode seal for a metallurgical furnace of the present invention.
Figure 8:
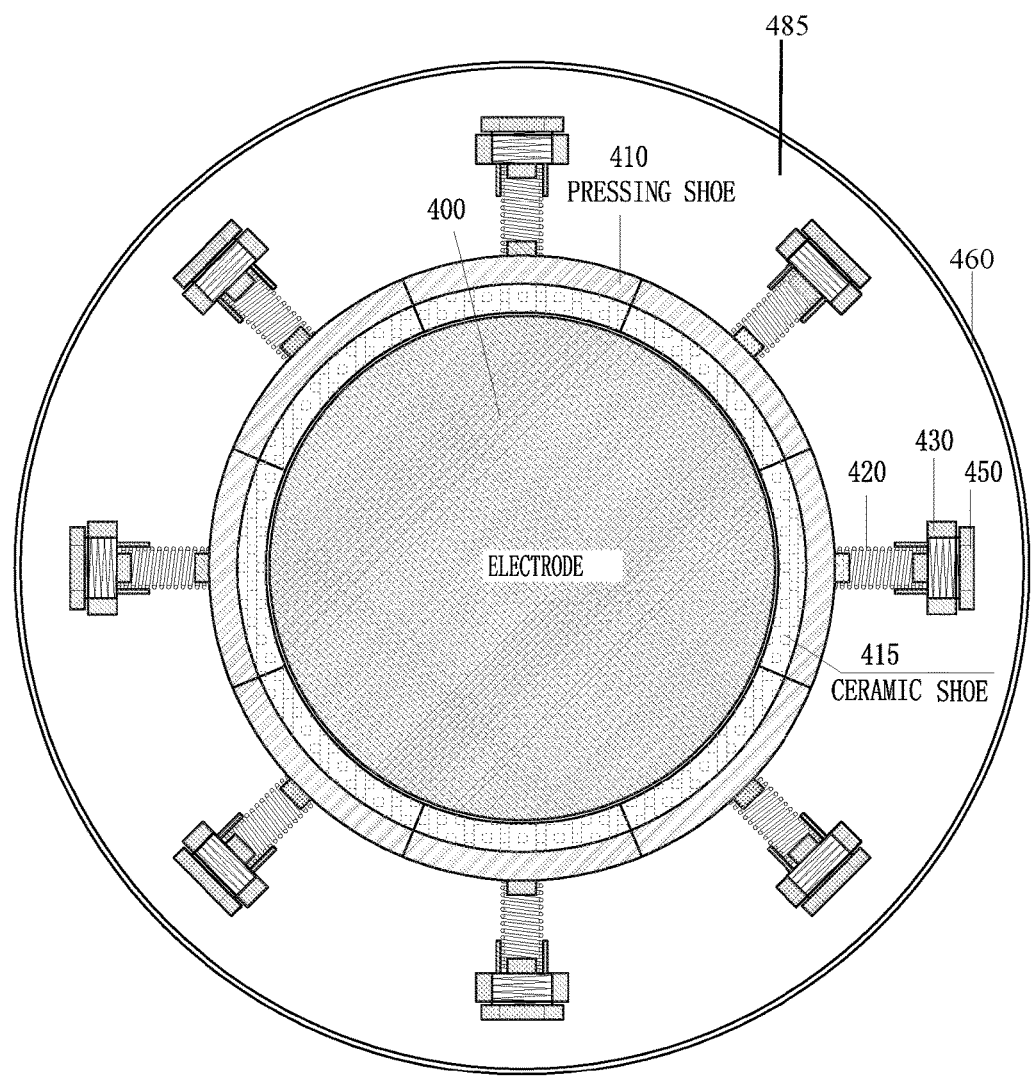
FIG. 8 is a horizontal cross-sectional view depicting an exemplary electrode seal for a metallurgical furnace of the present invention.
Figure 9:
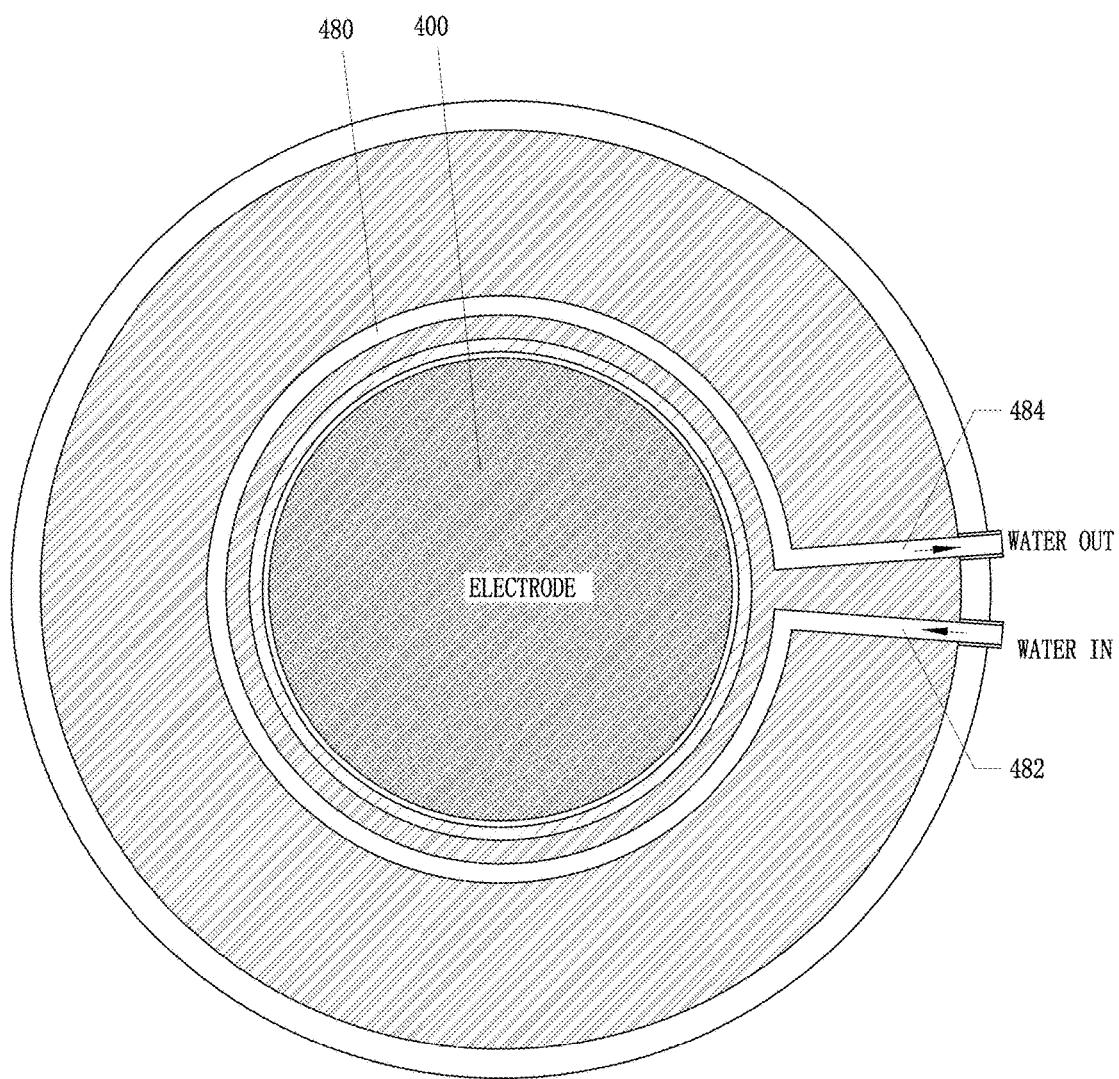
FIG. 9 is a horizontal cross-sectional view depicting an exemplary electrode seal for a metallurgical furnace of the present invention.
Figure 10:
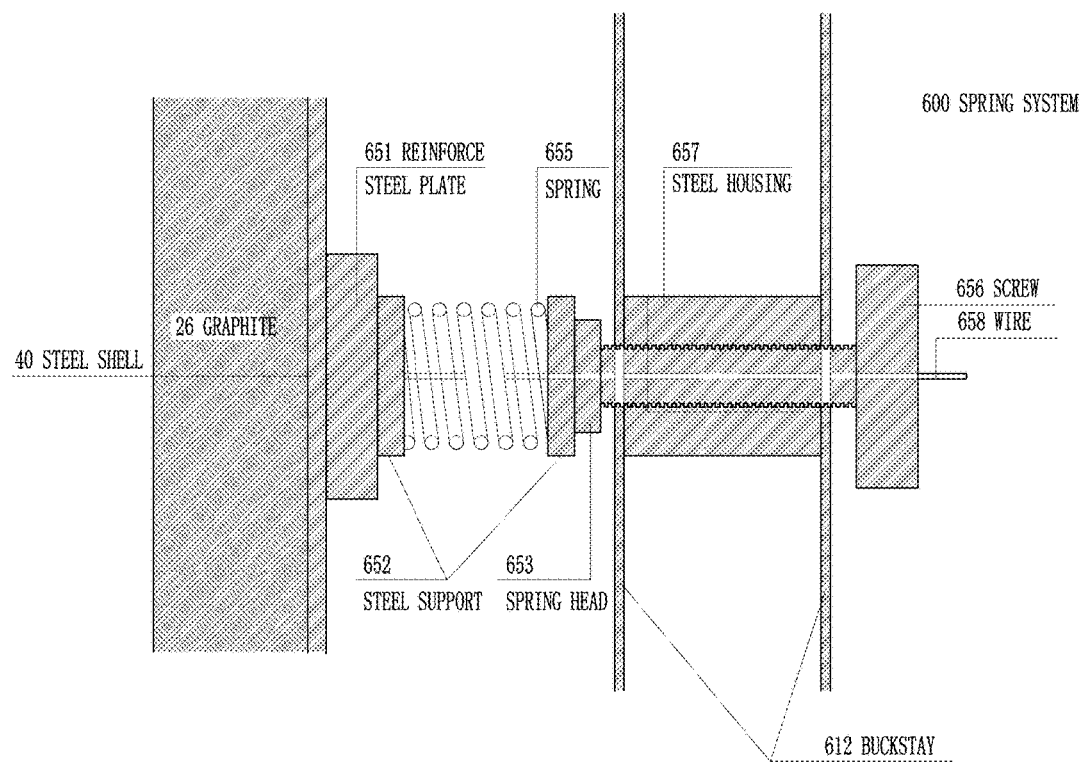
FIG. 10 is a side view depicting an exemplary electrode seal for a metallurgical furnace of the present invention.
Figure 10A:
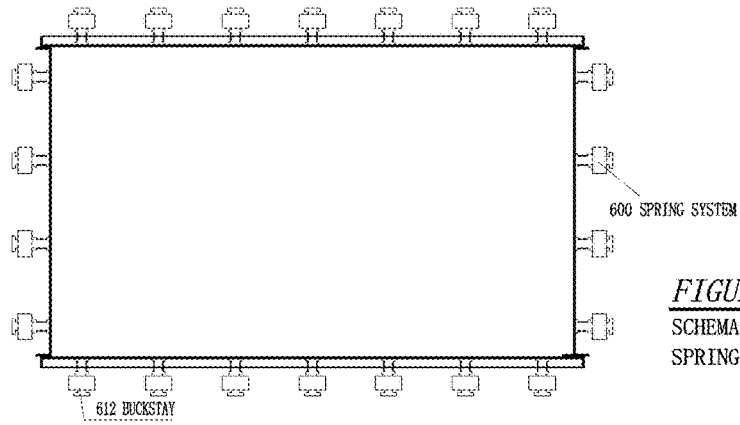
FIG. 10A is a schematic top view depicting pressing member locations of an exemplary metallurgical furnace of the present invention.
Figure 10B:
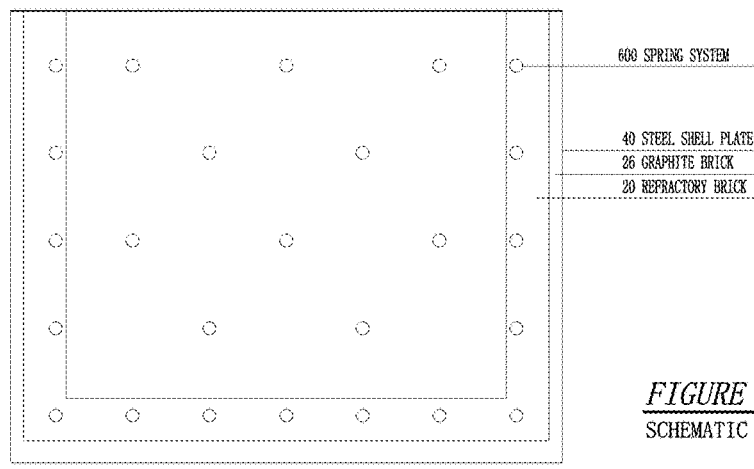
FIG. 10B is a schematic longitudinal view depicting pressing member locations of an exemplary metallurgical furnace of the present invention.
Figure 10C:
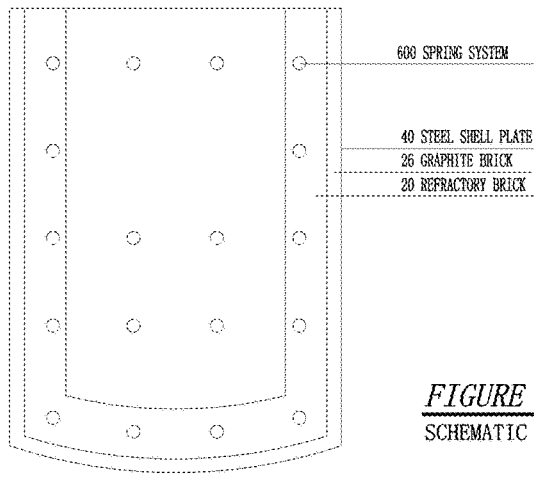
FIG. 10C is a schematic end view depicting pressing member locations of an exemplary metallurgical furnace of the present invention.
Figure 11:
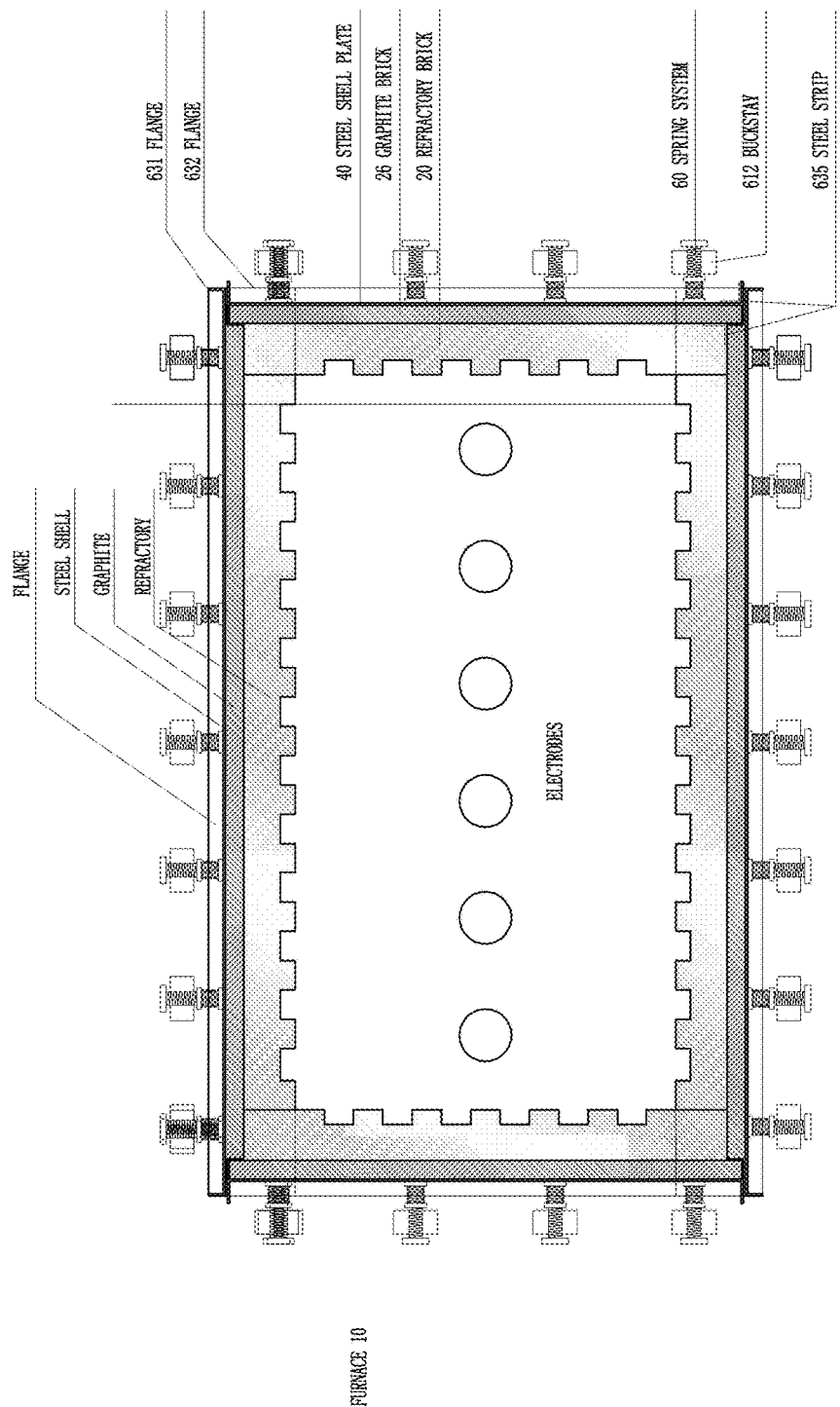
FIG. 11 is a top view of an arrangement of an exemplary metallurgical furnace according to the present invention.

With reference to FIGS. 7 and 8, preferred furnace 10 in accordance with exemplary aspects the present invention comprise one or more electrodes 400 which are suspended into the inner furnace space 30 through openings in the roof 200, which may be in blocks 210 that are positioned adjacent to the centremost block 212. In the embodiment depicted, the electrode 400 is kept in place by a seal system for cooling the electrode 400 and providing electrical insulation around the electrode 400. In use, typical electrodes 400 of furnace 10 of the present invention may experience electrical voltages of up to 1000V, and currents vary based on the power rating and the electrode size.

The seal system depicted in FIG. 7 comprises a plurality of ceramic sealing and insulating sets of shoes 415 surrounding the electrode 400 and corresponding pressing shoe members 410 radially pressing the sealing shoes 415 and the electrode 400. The sets of ceramic shoes 415 may each form an L-shape, so as to be supported by a cap 460, which may be made of a non-magnetic material, for example copper, as depicted in FIG. 7. The shoe members 410 may be made of a non-magnetic material, for example copper. As shown in FIG. 8, each shoe member 410 is biased or forced against the sealing shoe 415 and electrode 400 by one of a plurality of biasing members 420, which may be springs. In the embodiment depicted, each pair of shoes 415 and 410 is configured to snugly fit against the adjacent pair of 415 and 410, and is shaped appropriately to collectively form an annular ring around the electrode 400. The sets of ceramic sealing shoe members 415 and pressing members 410 may function as the main seal of the electrode 400, electric insulator, as well as a cushion to accommodate the lateral movement of the electrode 400. The force exerted by the biasing members 420 must be adjusted so as not to reduce resistance to vertical movement of the electrode 400.

In preferred embodiments, each biasing member 420 is supported by a non-magnetic stud 430, which may be made of copper and may be threaded. The stud 430 may be welded onto or otherwise connected to a thick non-magnetic cooling plate 475, which may be made of copper, and the pressure of the biasing member 420 may be adjusted by a screw 450 threaded through the stud 430. Above the shoes 410 and above the stud 430, a cap 460, which may be constructed of non-magnetic metal, may be disposed and supported by the studs 430. As shown in FIG. 7, in especially preferred embodiments, threaded copper cap 460 may be screwed onto the cooling plate 475 with a thread made on the outside edge to form a seal between cap 460 and the copper cooling plate.

In certain preferred embodiments, the electrode seal is adapted to cool the electrode 400 during use. As shown in FIG. 7, a non-magnetic plate 475, which may be made of copper, may form the bottom of the electrode seal. The ceramic sealing shoes 415 may be extended down to the bottom edge of the cooling plate 475 to completely isolate the copper plate 475 from the electrode 400. A thin layer of ceramic wool material 466 may be placed between 415 and 410 that may further extend downward to fill some or all of a possible gap between the seal shoes 415, the plate 475 and castable 405. The plate 475 is sitting on and supported by the roof copper cap 215 which in turn supported by the suspension rod 235. A layer of electrical insulation material 476 may further be placed between the plate 475 and the cap 215.

In preferred embodiments, at the bottom of the copper cooling plate 475, the surface is covered with a layer of castable, which may be made of high alumina, functioning as an electrical insulator. This insulation layer 405 may be at least of 50 to 100 mm thick. In order to lock the insulation layer 405, the bottom surface of the copper plate 475 may be roughened by making grooves with 10 to 20 mm deep. In preferred embodiments, conductive network 220 and framework 230 of the adjacent roof members will be covered with at least 50 to 100 mm thick of alumina castables. During use, in an unlikely event the insulation layer castable 405 fails and an electrical bridge is formed between electrode and copper plate 475 with condensed fumes and dusts, insulating layer 476 may retain its function in isolating roof cap 215 from copper plate 475.

The copper cooling plate 475 may define a channel 480 therein, through which cooling liquid may be directed. In the embodiment depicted, the channel 480 has a generally circular shape, but skilled persons will appreciate that other shapes may also provide a functional cooling channel. In the embodiment depicted in FIG. 9, cooling liquid, for example water, may be directed into the cooling channel 480 through an inflow member 482, be then displaced around the cooling channel 480, and flow out of the cooling channel 480 through an outflow member 484. The cooling liquid in the cooling channel 480 may be pressurized, in order to increase the cooling rate. In especially preferred embodiments, this cooling liquid will, during use, flow around the cooling channel 480, thereby cooling the electrode 400, flow out of the cooling channel 480, be cooled, and then reintroduced to the cooling channel 480, all on a continuous basis.

As depicted in FIG. 7, an opening 465 in the non-magnetic cap 460 may be included, to allow pressurized nitrogen (N2), or any other suitable gas, for example argon, to be directed into the seal. The pressurized gas may penetrate through the holes in the shoes and thereby be distributed around the electrode evenly to push down along the electrode in order to contribute to preventing the furnace gas and dusts from within the furnace space flowing through the gap around the electrode, in turn, thereby preventing at least some of the gas from leaking and preventing at least some substance attached to the electrode from hindering vertical movement of the electrode.

The ceramic sealing shoes 415 may be further extended upward with an L-shape top to cover the non-magnetic cap 460. Extra high temperature resistance packing material 467 may be packed with sealing shoes 415 into a chamber 485 surrounding the electrode 400, which may function to maintain suitable pressure of the gas limiting leaks into the furnace or into the ambient atmosphere. This seal chamber may comprise a non-magnetic ring 462 welded on cap 460. The top of the ring 462 is threaded to tighten the threaded cap 464. The cap has a large clearance from the electrode 400. In preferred embodiments, a ceramic washer 468 as an electrical insulator is placed below the non-magnetic cap 464 to even the pressure onto the packing material 467, which may act as cushion and seal. In general, electrode seals of the present invention will be constructed in such a way as to provide electrical insulation between all metals and the electrode 400. Additionally, in preferred embodiments, all electrode seal supporting materials may comprise non-magnetic metals or alloys, in order to reduce generation of induced current. Copper is a preferred material because of its high thermal conductivity, as elements including 410, 460, and 462 may be in contact with copper cooling plate 475 and may thereby be cooled during use.

An additional example of the bricks and steel shell arrangement for an ilmenite smelting furnace in accordance with an embodiment of the present invention is as follows. A furnace having 50-60 MW operating power, with 2 layers of periclase brick (228.6 mm in thickness for thinner bricks and 406.4 mm for thicker bricks) and one layer of graphite brick (228.6 mm thick) comprising the refractory for the furnace from the bottom at the skewback to the freeboard surrounded by a steel shell. The honey-comb shaped inner surface of the bricks including the cavities resulting from the staggered bricks with different thickness are covered with a layer (50.8 mm) of MgO castables as a sacrificial material during start-up. However, for the area in the molten iron, the cavities could be optionally filled with the castables. The steel shell internal diameter (ID) during normal furnace operation (under hot conditions) is 13,379 mm. It is expected to be contracted to 13,208 mm when the furnace is fully cooled down, representing a contraction of 85 mm of refractory in radial direction. Assuming 8 pieces of curved steel shell plate are used to comprise the shell, the clearance between each plate before the furnace start-up, when papers are placed between radial layers of bricks to approximate an expanded configuration, is estimated at 67 mm. For the innermost layer of periclase brick whose inner width is 101.6 mm (hottest) requires 7 papers per 2 bricks with paper thickness of 0.4 mm. For the outer layer of periclase brick it requires 2 papers per brick. For the graphite brick, it is recommended to use graphite felt as cushion. It is assumed at new installation, the graphite felt can be pressed to reduce 20% of the thickness at regular operating condition and during contraction to complete cold condition, it can be pressed to reduce 70% of its thickness. Thus it is estimated that every two graphite bricks require 8 mm thick of graphite felt without any compression. Under hot conditions, the thickness is 6.4 mm and at maximum compression it becomes 2.4 mm.

In that additional example, for the hearth refractory, expansion papers may also be used. It is estimated that for the innermost layer 5 expansion papers may be required to place around each brick. Underneath this layer 6 expansion papers may be needed before next layer (2nd layer) of refractory. For next layer (2nd layer) of refractory, every 3 bricks as a block may require 8 papers and 2 papers may be placed between this layer and next layer (3rd) of refractory. No papers may be required for bricks for the 3rd layer of refractory and between graphite bricks. At the top layer of refractory, again a sacrificial layer of MgO castable of 50.8 mm thick is cast on the top surface of the refractory.

In that additional example, in use, in view of the refractory movement during expansion and contraction, at the both ends of each curved vertical shell plate a flange may be welded on the end before the start-up. Adjacent shell segments may be bolted on the flange to fix with the hearth flange at the bottom and at the top with a steel floor. After the bricks lined on the hearth, the shell plates may be installed and locked with a screw, bolt, or other suitable fastening means, for example by coupling to flanges 46. Bricks 26 may then be lined against the shell segments, with the remaining layers 24, 22 lined against bricks 26, to form the refractory. After bricks are laid and springs are loaded around the shell plates, the fastening means may then be removed so the plates may move freely as the furnace expands or contracts. It is estimated the hottest side temperature of the inner brick during operation is approximately 800-1000 degrees Celsius, and the same brick at the cold side is approximately 400 degrees Celsius. For a furnace with an overall height of 11 m, the hot side will expand vertically by 152 mm versus the cold side at approximately 84 mm. Therefore, correction may be made of the brick height to accommodate this uneven expansion, otherwise the top brick may be tilted and the spring load on the brick will be uneven. For example, where the brick height is designed at 4" or 101.6 mm, for every 4 courses of brick, the hot side of the brick may be shorter by 2.5 mm, i.e. a height of 68 mm for correction. The total number of courses of brick for the wall is 108. Correction may not be made for the top eight courses. For the next layer of brick toward the shell, the correction is similar but 3 mm with 5 courses of brick. The graphite brick may not be corrected, because the temperature is low and the linear expansion coefficient is almost zero. At the top of the sidewall bricks, a layer of Teflon™ may be laid, with a steel ring plate laid on top thereof, for direct engagement with vertical compression members which may be springs.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A metallurgical furnace comprising: a refractory, surrounding a furnace space, for dissipating heat when the furnace space is heated; a force exerting member for contracting a segmented outer shell around the refractory, toward the furnace space, as the refractory contracts when the furnace space is cooling, wherein the force exerting member comprises a plurality of cables, the cables disposed around an outer surface of the segmented outer shell at vertically spaced intervals, and wherein each of the plurality of cables is supported on a support member, and wherein at least one of the plurality of cables has a tension member mounted thereto for adjusting the length of the cable, thereby adjusting the tension of the tension member and the force exerted by the cable.

2. The metallurgical furnace of claim 1, wherein the force exerting member allows the refractory to expand when the furnace space is heated and exerts a compressive force on the refractory as the refractory contracts when the furnace space is cooling.

3. The metallurgical furnace of claim 1, wherein the force exerting member comprises a plurality of pressing members disposed around an outer surface of the segmented outer shell, each pressing member for pressing against an outer surface and thereby exerting a compressive force thereon.

4. The metallurgical furnace of claim 3, wherein the pressing members comprise spring members.

5. The metallurgical furnace of claim 3, wherein the pressing members are adjustable to apply greater or lesser compressive force on the segmented outer shell.

6. The metallurgical furnace of claim 3, wherein the pressing members are biased against the outer surface of the segmented steel shell by biasing members.

7. The metallurgical furnace of claim 1, additionally comprising at least one tension member mounted to the force exerting member for exerting tension on the force exerting member, thereby exerting the force.

8. The metallurgical furnace of claim 7, wherein the at least one tension member comprises a spring.

9. The metallurgical furnace of claim 7, wherein the force exerting member is supported on a plurality of support members which are vertical columns disposed around the segmented outer shell.

10. The metallurgical furnace of claim 7, wherein the force exerting member engages at least one positioning member, the positioning member allowing for movement of the segmented outer shell relative to the force exerting member.

11. The metallurgical furnace of claim 7, wherein the force exerting member engages at least one positioning member, the positioning member allowing for movement of the segmented outer shell relative to the force exerting member, wherein the positioning member is a wheel member pivotally mounted to the support member.

12. The metallurgical furnace of claim 1, further comprising at least one force adjustment member connected to the force exerting member for initially adjusting a force exerted by the force exerting member.

13. The metallurgical furnace of claim 1, further comprising at least one force measuring member connected to the tension member for measuring a tension of the tension member and thereby measuring a force exerted by the force exerting member.

14. The metallurgical furnace of claim 13, wherein the force measuring member is a dynamometer for measuring the tension of a spring.

15. The metallurgical furnace of claim 1, wherein the refractory is radially symmetric in cross-section at at least one point along its height.

16. The metallurgical furnace of claim 15, wherein the refractory is generally round in cross-section at at least one point along the refractory's height.

17. The metallurgical furnace of claim 1, wherein the segmented outer shell is generally cylindrical in shape in a contracted configuration when the furnace space is cooled, and wherein the segmented outer shell comprises at least one gap between horizontally adjacent shell segments in an expanded configuration when the furnace space is heated.

18. The metallurgical furnace of claim 17, further comprising one or more sealing members for sealing the at least one gap between horizontally adjacent shell segments in an expanded configuration when the furnace space is heated.

19. The metallurgical furnace of claim 18, wherein the one or more sealing members are strips for placement between the refractory and the segmented outer shell at a position for sealing at least one gap between horizontally adjacent shell segments in an expanded configuration when the furnace space is heated.

20. The metallurgical furnace of claim 19, wherein the refractory comprises an innermost layer of thermally conductive bricks disposed around the furnace space for absorbing and dissipating the heat.

21. The metallurgical furnace of claim 20, wherein the refractory further comprises at least one additional layer of thermally conductive bricks disposed around the innermost layer of thermally conductive bricks, for further absorbing and dissipating the heat.

22. The metallurgical furnace of claim 21, wherein the additional layer comprises bricks comprising a different material than bricks of innermost layer.

23. The metallurgical furnace of claim 20, wherein at least some of the thermally conductive bricks comprise periclase.

24. The metallurgical furnace of claim 20, wherein the refractory further comprises an outermost layer of bricks disposed around the one or more layers of thermally conductive bricks.

25. The metallurgical furnace of claim 24, wherein the outer layer of bricks comprises a graphite material.

26. The metallurgical furnace of claim 25, wherein the refractory, prior to the furnace space being initially heated, comprises at least one layer of spacer material between the innermost and the least one additional layer of thermally conductive bricks, thereby resulting in a refractory diameter larger than a contracted configuration of the shell, and wherein the spacer material is made of a material adapted to combust or dissipate when the furnace space is heated, thereby leaving space to compensate for additional space occupied by expanding thermally conductive bricks.

27. The metallurgical furnace of claim 1, wherein the segmented outer shell comprises at least three segments.

28. The metallurgical furnace of claim 1, wherein the segmented outer shell comprises a smaller or larger number of segments proportionate with the relative size of the furnace.

29. The metallurgical furnace of claim 28, wherein the segmented outer shell comprises at least eight segments.

30. The metallurgical furnace of claim 1, wherein each segment of the segmented outer shell comprises an edge which is adapted to cooperate with an edge of an adjacent shell segment.

31. The metallurgical furnace of claim 1, further comprising one or more sealing members for placement between the segmented outer shell and the refractory, each sealing member for sealing one or more gaps formed between horizontally adjacent shell segments in an expanded configuration when the furnace space is heated.

32. The metallurgical furnace of claim 1, further comprising one or more retaining members for movably connecting pairs of horizontally adjacent shell segments, each retaining member thereby providing a maximum gap distance between each connected pair of horizontally adjacent shell segments.

* * * * *